(12) United States Patent
Zurwieden et al.

(10) Patent No.: US 11,523,617 B2
(45) Date of Patent: Dec. 13, 2022

(54) FOUR CLIP CLIPPING MACHINE

(71) Applicant: Poly-clip System GmbH & Co. KG, Hattersheim (DE)

(72) Inventors: Martin Zurwieden, Libertyville, IL (US); Detlef Ebert, Bad Nauheim (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 0 days.

(21) Appl. No.: 17/187,630

(22) Filed: Feb. 26, 2021

(65) Prior Publication Data

US 2021/0267221 A1    Sep. 2, 2021

Related U.S. Application Data

(63) Continuation-in-part of application No. 16/805,296, filed on Feb. 28, 2020, now Pat. No. 11,160,283.

(51) Int. Cl.
*A22C 11/00* (2006.01)
*A22C 11/10* (2006.01)

(52) U.S. Cl.
CPC .................................... *A22C 11/10* (2013.01)

(58) Field of Classification Search
CPC ...... A22C 11/10; A22C 11/105; A22C 11/125
USPC ...................................................... 452/46–48
See application file for complete search history.

(56) References Cited

U.S. PATENT DOCUMENTS 3,061,838 A    11/1962  Frank
6,524,178 B1   2/2003   Fassler et al.

7,575,506 B2   8/2009   Ebert et al.
7,666,072 B2 * 2/2010   Schalk ............... A22C 11/12
                                             452/48
(Continued)

FOREIGN PATENT DOCUMENTS

EP    1728722 B1    9/2012
EP    1967074 B1    6/2014
(Continued)

OTHER PUBLICATIONS

EPO; Application No. 21159648.1; Extended European Search Report dated Dec. 8, 2021.
(Continued)

*Primary Examiner* — Richard T Price, Jr.
(74) *Attorney, Agent, or Firm* — Fitch, Even, Tabin & Flannery LLP

(57) ABSTRACT

A clipping machine for producing sausage-shaped products is provided, comprising gathering means for forming a plait-like portion from tubular packaging casing filled with filling material and a closing unit for applying at least four closure means to the plait-like portion. Moreover, a guide unit is provided for guiding closure means to a closing unit of a clipping machine, being configured to supply at least two closure means to a first closing device of the closing unit and at least two further closure means to a second closing device of the closing unit. There is also provided a method for producing sausage-shaped products, comprising filling a portion of tubular or bag-shaped packaging casing with filling material, forming a plait-like portion therefrom and applying at least two closure means to a first section of the plait-like portion while substantially simultaneously applying two closure means to a second section of the plait-like portion.

12 Claims, 16 Drawing Sheets

(56) References Cited

U.S. PATENT DOCUMENTS

Figure 1A:
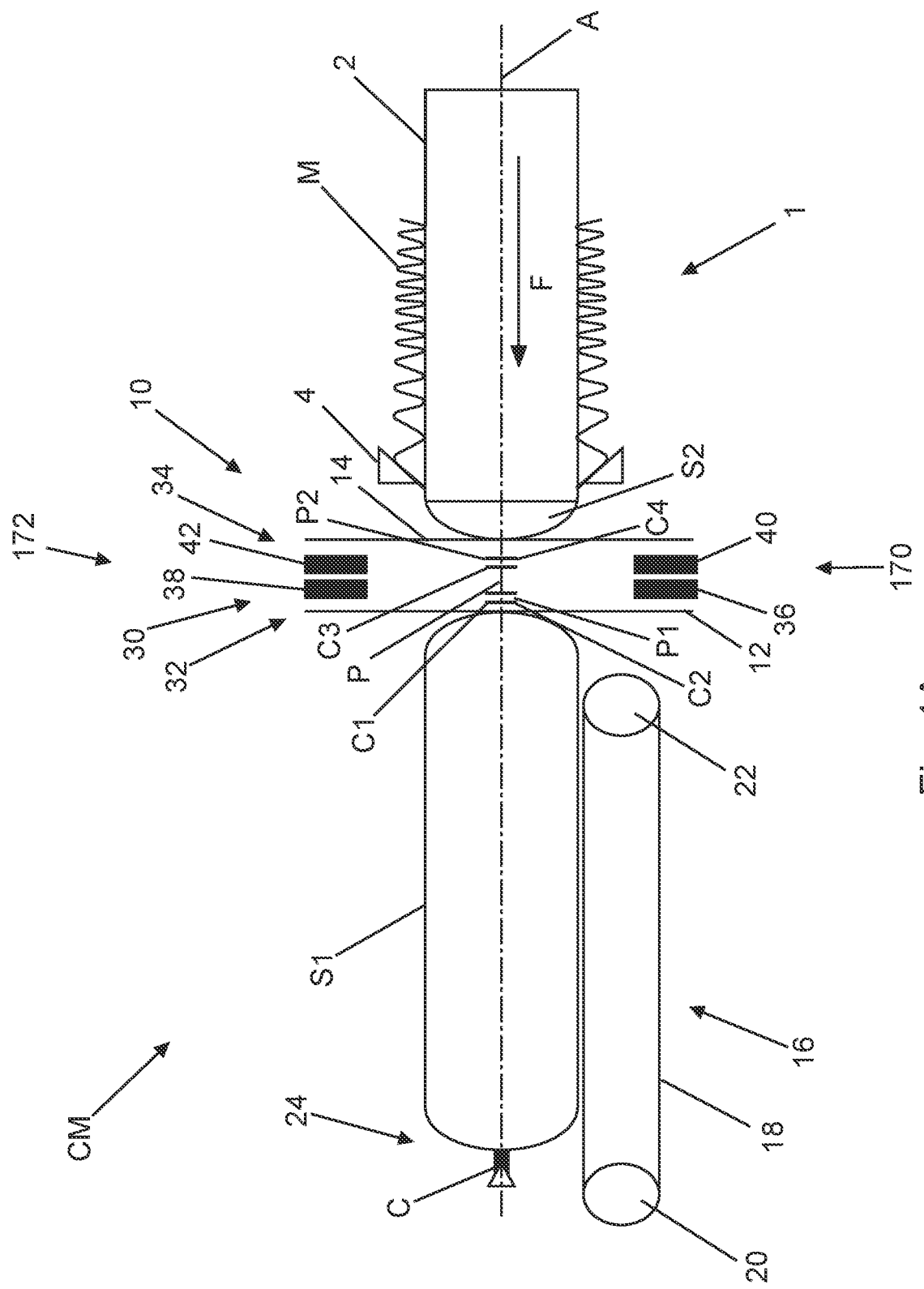

| | | | |
|---|---|---|---|
| 7,954,231 B2 | 6/2011 | Meyrahn et al. | |
| 8,795,037 B2* | 8/2014 | Haschke | A22C 11/125 |
| | | | 452/48 |
| 8,870,634 B2* | 10/2014 | Niedecker | A22C 11/0227 |
| | | | 452/37 |
| 9,615,589 B2* | 4/2017 | Ebert | A22C 11/0245 |
| 9,861,110 B2* | 1/2018 | Ebert | A22C 11/10 |
| 9,894,907 B2* | 2/2018 | Sames | A22C 11/02 |
| 9,936,710 B2* | 4/2018 | Le Paih | A22C 11/105 |
| 9,986,744 B2* | 6/2018 | Ebert | A22C 11/00 |
| 2008/0227377 A1 | 9/2008 | Duringer | |
| 2013/0189912 A1 | 7/2013 | Ebert et al. | |
| 2014/0051342 A1* | 2/2014 | Haschke | A22C 11/125 |
| | | | 452/48 |
| 2015/0093980 A1 | 4/2015 | Wiemer et al. | |

FOREIGN PATENT DOCUMENTS

| | | |
|---|---|---|
| EP | 3001908 A1 | 4/2016 |
| EP | 2884847 B1 | 6/2018 |

OTHER PUBLICATIONS

Australian Patent Office; Application No. 2021201298; Examination Report No. 1 dated Oct. 14, 2021.

Federal Service for Intellectual Property; Application No. 2021104753; Decision to Grant dated Sep. 27, 2021.

* cited by examiner

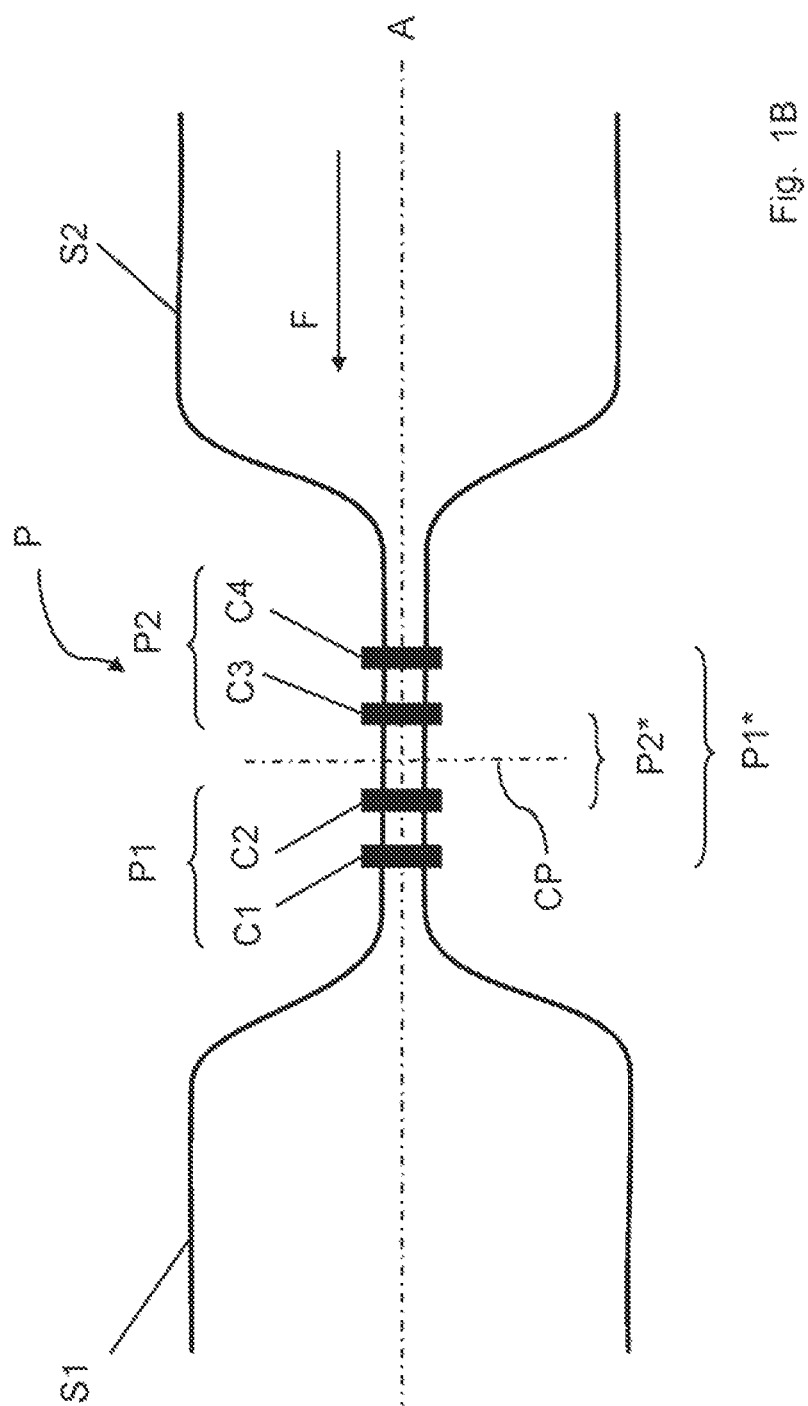

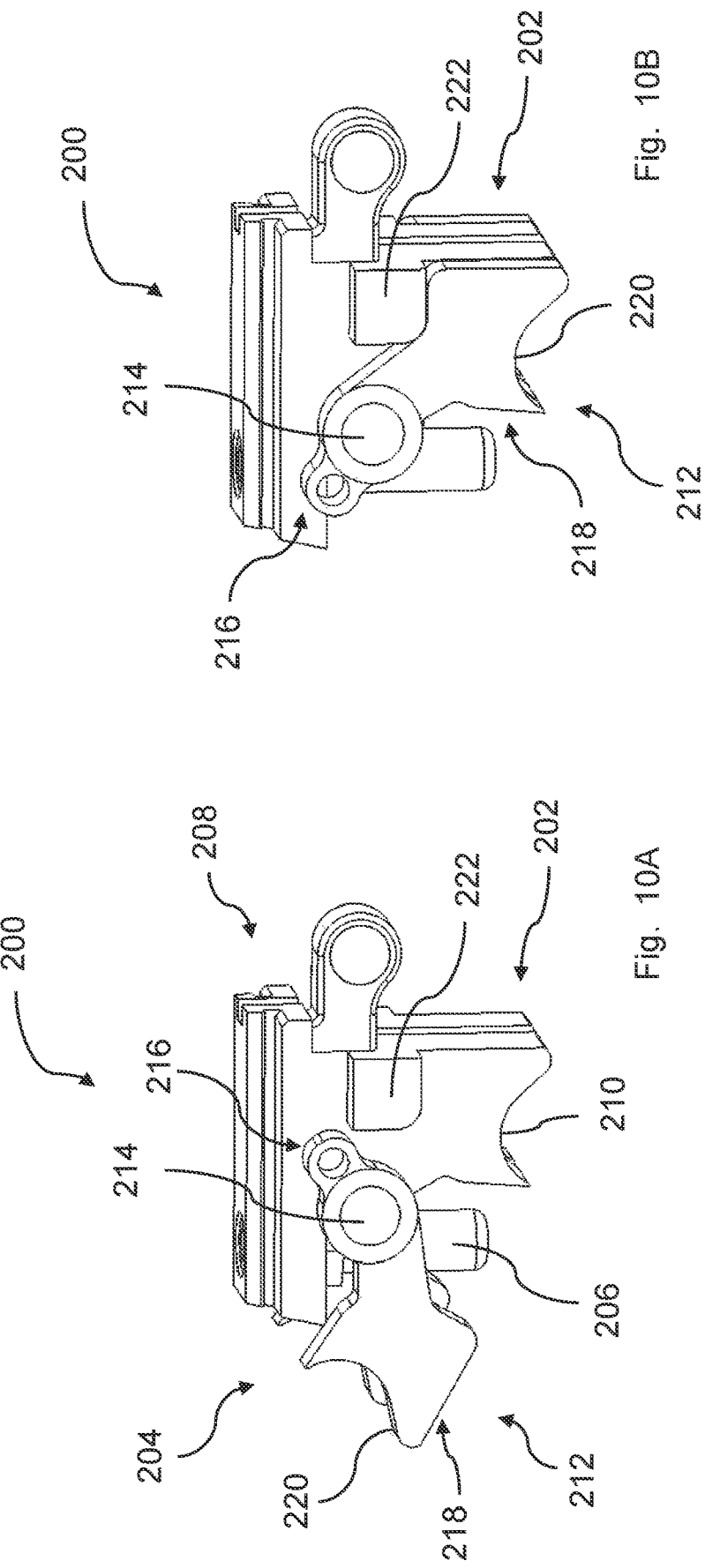

FOUR CLIP CLIPPING MACHINE

CROSS-REFERENCE TO RELATED APPLICATION

This application is a continuation-in-part of U.S. application Ser. No. 16/805,296, filed Feb. 28, 2020.

FIELD OF THE INVENTION

The present invention generally relates to devices and methods for producing sausage-shaped products. In particular, the present invention relates to devices configured to facilitate application of at least four closure clips to a plait-like portion of a tubular packaging casing of sausage-shaped products to be produced and to methods for facilitating application of at least four closure clips to a plait-like portion of a tubular packaging casing of sausage-shaped products to be produced.

BACKGROUND OF THE INVENTION

In practice, it is known that, for example in the production of sausage-shaped products, like sausages, filling material is fed by a filling machine through a filling tube forming a component of filling means of a clipping machine into a tubular packaging casing which is stored on the filling tube and which is closed at its front end, i.e. the end pointing in the feeding direction of the filling material by a closure means, like a closure clip. The tubular packaging casing is pulled-off from the filling tube while being filled by the feeding pressure. A casing brake applies a frictional force to the tubular packaging casing while being pulled-off from the filling tube, in order to control the pull-off motion of the tubular packaging casing. After a predetermined amount of filling material has been filled into said tubular packaging casing, gathering means with a first and a second displacer unit, which can each be formed by a pair of reversibly moveable displacement elements, form a plait-like portion of the tubular packaging casing which is at least approximately free from filling material.

The clipping machine then places and closes at least one closure clip at the plait-like portion forming the rear end of the sausage-shaped product just produced, i.e. the end pointing against the feeding direction, by a clipping unit having respective closing tools which are reversibly movable towards the plait-like portion. The closure clip applied to the front end of the sausage-shaped product, as described above, may be pre-applied to a tubular packaging casing stored on the filling tube, or alternatively be applied by the clipping unit prior to placing and closing the at least one closure clip at the plait-like portion forming the rear end of the sausage-shaped product. When producing two or more sausage-shaped products in succession, typically two closure clips are applied to a respective plait-like portion. A first one of the two closure clips applied to the plait-like portion closes a rear end of the sausage-shaped product just produced and the second closure clip of the two closure clips applied to the plait-like portion closes a front end of a sausage-shaped product to be produced next. The first and second sausage-shaped product may be separated by cutting the plait-like portion between the first closure clip and the second closure clip.

In these sausage-shaped products, the closure clips applied to a respective front and rear end of the sausage-shaped products may also facilitate sealing the tubular packaging casing, for example to reduce the risk of leakage of filling material from the tubular packaging casing through the front and rear end. Moreover, the closure clips can serve as an area of attachment of further handling and/or labeling elements, such as suspension loops for hanging onto a rod-like element and/or print-labels providing information such as production lot and/or production date. For the prevention of leakage, a high closing force applied to the plait-like portion is desirable. However, a high closing force may damage the tubular packaging casing material and/or limit the remaining capability to bear loads introduced by a suspension element. Moreover, components of a closing device need to be adapted to withstand the high closing force with great effort. It is thus evident that many, potentially conflicting requirements for closing front and rear ends of tubular packaging casing may have to be considered in the production of sausage-shaped products.

While the sausage-shaped products obtained in an above-described manner are generally viewed as satisfactory overall, there remains to be a demand for improvements, in particular when potentially conflicting requirements for closing front and rear ends of sausage-shaped products are to be balanced.

SUMMARY OF THE INVENTION

Therefore, the present invention provides devices and methods of the above described kind for producing sausage-shaped products which facilitate improved closing of ends of tubular or bag-shaped packaging casing.

In a first aspect of the present invention, a clipping machine for producing sausage-shaped products, like sausages, containing a filling material in a tubular or bag-shaped packaging casing is provided. The clipping machine comprises gathering means for forming a plait-like portion of the tubular or bag-shaped packaging casing and a closing unit for applying at least four closure means, such as closure clips, to the plait-like portion. The plait-like portion is at least approximately free of filling material. The closing unit comprises at least a first closing device and a second closing device. The first closing device is configured to apply at least two closure means, also referred to as first pair of closure means, of the at least four closure means to a first portion or section of the plait-like portion of the tubular or bag-shaped packaging casing. The second closing device is configured to apply at least two further closure means, also referred to as second pair of closure means, of the at least four closure means to a second portion or section of the plait-like portion of the tubular or bag-shaped packaging casing.

By applying at least four clips to the plait-like portion of sausage-shaped products to be produced, the present invention makes it possible to reduce the risk of leaks in the tubular or bag-shaped packaging casing of the produced sausage-shaped products even more reliably than the prior art, without having to increase the closing force or closing pressure at the same time. This may particularly be beneficial when fragile wrapping material is used for the tubular or bag-shaped packaging casing. Moreover, this is of further advantage when the produced sausage-shaped product is stored vertically, such that a substantial portion of the weight of the filling material rests on a rear or front end of the sausage-shaped product. Alternatively or additionally, the closing unit is configured to simultaneously apply the first pair of closure means and the second pair of closure means. Simultaneous application of four closure means may advantageously contribute to speedy production of sausage-shaped products. In some implementations, the closing unit is configured to apply the second pair of closure means after the first pair of closure means has been applied. In some implementations, the closing unit is configured to apply the first pair of closure means after the second pair of closure means has been applied. Such sequential application of a first pair of closure means followed by a second pair of closure means may advantageously contribute to keeping a closing force required to be provided by the closing unit at an acceptable level.

It further has to be understood that, while the following paragraphs generally refer to the application of a first pair of closure means and a second pair of closure means, i.e. a total of four closure means, the present invention is not limited to the application of four closure means. In some implementations of the present invention, more than two closure means are applied to the first and/or second section of the plait-like portion, in particular three, four, five, six or seven closure means. In some implementations of the present invention, the number of closure means applied to the first section is greater than two and greater than the number of closure means applied to the second section. In alternative implantations of the present invention, the number of closure means applied to the second section is greater than two and greater than the number of closure means applied to the first section. In other alternative implementations of the present invention, the number of closure means applied to the first section is greater than two and equal to the number of closure means applied to the second section.

The first and the second section of the plait-like portion are defined by respective sections of the plait-like portion at which the respective pairs of closure means are applied. That is the first section is a portion of the plait-like portion at which the first pair of closure means is applied and the second section is a portion of the plait-like portion at which the second pair of closure means is applied.

In preferred embodiments, the second section of the plait-like portion, where the second pair of closure means is applied, is a sub-section of the first section of the plait-like portion, where the first pair of closure means is applied. In particularly preferred embodiments, the first section of the plait-like portion includes a rear end, i.e. an end pointing against a feeding direction of the filling material, of a first sausage-shaped product to be produced as well as a front end, i.e. an end pointing in the feeding direction, of an adjacent second sausage-shaped product to be produced. Further, in these particularly preferred embodiments, the second section of the plait-like portion is a sub-section of the first section, i.e. encompasses only a fraction of the first section. Optionally, in such particularly preferred embodiments, the second section is placed at a center of the first section. More preferably, the second section is placed at the center of the first section at equal spacing with respect to ends of the first section. In other words, in these embodiments, the second section is arranged symmetrically with respect to the ends of the first section.

Alternatively or additionally, the second section comprises a portion of the rear end of the first sausage-shaped product to be produced and/or a portion of the front end of the second sausage-shaped product to be produced. In particularly preferred embodiments, a first closure means of the first pair of closure means applied to the first section thereby closes and/or seals the rear end of the first sausage-shaped product to be produced and/or the second closure means applied to the first section thereby closes and/or seals the front end of the second sausage-shaped product to be produced. Moreover, in these particularly preferred embodiments, the second pair of closure means applied to the second section is thereby placed between the first and second closure means of the first pair of closure means. In such particularly preferred embodiments, the first pair of closure means can also be referred to as outer pair of closure means, and the second pair of closure means can be referred to as inner pair of closure means. Likewise, the first section of the plait-like portion can also be referred to as outer section, and the second section of the plait-like portion can also be referred to as inner section. More preferably, the second section of the plait-like portion is defined such that the first closure means of the second or inner pair of closure means is positioned adjacent the first closure means of the first or outer pair of closure means and/or the second closure means of the second or inner pair of closure means is positioned adjacent the second closure means of the first or outer pair of closure means. Optionally, a location at which the first sausage-shaped product is to be separated (e.g. cut) from the second sausage-shaped product is positioned within the second section of the plait-like portion. More preferably, the second section of the plait-like portion is defined such that the location at which the first sausage-shaped product is to be separated (e.g. cut) from the second sausage-shaped product lies between the first and second closure means of the second or inner pair of closure means.

Alternatively or additionally, the first section of the plait-like portion, to which the first pair of closure means is applied, is provided downstream with respect to the feeding direction of the filling material from the second section of the plait-like portion, to which the second pair of closure means is applied. In other words, in such embodiments, the first and second sections are consecutive or non-overlapping sections. In such preferred embodiments, the first pair of closure means can also be referred to as downstream pair of closure means, and the second pair of closure means can be referred to as upstream pair of closure means. In particularly preferred embodiments, the first section of the plait-like portion of the tubular or bag-shaped packaging casing forms a rear end, i.e. an end pointing against the feeding direction of a first sausage-shaped product to be produced. Moreover, in such particularly preferred embodiments, the second section of the plait-like portion of the tubular or bag-shaped packaging casing forms a front end, i.e. an end pointing in the feeding direction of a second sausage-shaped product to be produced.

Alternatively or additionally, the clipping machine comprises filling means of the above described kind, such as a filling tube, feeding filling material in the feeding direction into a tubular packaging casing being stored on the filling tube. Alternatively or additionally, the gathering means are configured to form the substantially tubular plait-like portion of the tubular or bag-shaped packaging casing. In other words, the plait-like portion has cross-sectional dimensions, such as its height and width or such as its diameter, which are considerably smaller than its longitudinal extent, also referred to as the length of the plait-like portion. In particular, it has to be understood that a substantially tubular plait-like portion is different from a substantially flat plait-like portion. A substantially flat plait-like portion has a longitudinal extent, or length, being considerably larger than one of its cross-sectional dimensions, such as its height or width, whereas a second of its cross-sectional dimensions, such as its height or width, is of similar magnitude as its longitudinal extent, or length. Preferably, the gathering means comprise at least a first and a second displacer unit for displacing filling material from a section of the tubular or bag-shaped packaging casing filled with filling material so as to form the plait-like portion.

In a preferred embodiment of the first aspect of the present invention, the closing unit is configured such that the closure means of the at least two closure means applied to the first section of the plait-like portion, also referred to as first pair of closure means, are applied at a first predefined spacing from one another. The closing unit is further configured such that the closure means of the at least two further closure means applied to the second section of the plait-like portion, also referred to as second pair of closure means, are applied at a second predefined spacing from one another. In other words, a distance between the first and second closure means of the first pair of closure means is equal to the first predefined spacing. Correspondingly, a distance between the first and second closure means of the second pair of closure means is equal to the second predefined spacing. Preferably, the first predefined spacing and the second predefined spacing are substantially equal. Alternatively, it may be preferred that the first predefined spacing is larger than the second predefined spacing, or that the second predefined spacing is larger than the first predefined spacing. In further preferred embodiments of the first aspect of the present invention, the closing unit is configured such that the first and/or the second predefined spacing are adjustable.

Maintaining a predefined spacing between individual closure means of each pair of closure means may advantageously facilitate further processing, for example when subsequent processing operations rely on predictable positioning of the closure means. Moreover, it may provide an appealing visual impression of the ends of the sausage-shaped product.

Alternatively or additionally, the closing unit is configured such that the at least two closure means applied to the first section of the plait-like portion, also referred to as first pair of closure means, are applied at a predefined distance from the at least two further closure means applied to the second section of the plait-like portion, also referred to as second pair of closure means.

Preferably, in particular embodiments in which the first and second section are consecutive or non-overlapping sections, the predefined distance is defined between the second closure means of the first or downstream pair of closure means and the adjacent first closure means of the second or upstream pair of closure means. In other words, the second closure means of the first pair of closure means is thus located upstream of the first closure means of the first pair of closure means with respect to the feeding direction. Moreover, in these embodiments, the first closure means of the second pair of closure means is thus located downstream of the second closure means of the second pair of closure means with respect to the feeding direction.

Alternatively, in particular embodiments in which the second section of the plait-like portion is a sub-section of the first section of the plait-like portion, the predefined distance is defined between the first closure means of the first or outer pair of closure means and the adjacent first closure means of the second or inner pair of closure means. Alternatively or additionally, the predefined spacing is defined between the respective adjacent second closure means of the first or outer pair and the second or inner pair. In the particularly preferred symmetric configurations described above, the first closure means of the first pair of closure means is spaced at the predefined distance with respect to the adjacent first closure means of the second pair of closure means, and the second closure means of the first pair of closure means is likewise spaced at the predefined distance with respect to the adjacent second closure means of the second pair of closure means.

In further preferred embodiments, the predefined distance is greater than the first predefined spacing and/or the second predefined spacing. In alternatively preferred embodiments, the predefined distance is smaller than the first predefined spacing and/or the second predefined spacing. In further preferred embodiments, the closing unit is configured such that the predefined distance is adjustable.

Providing a predefined distance between the at least two closure means applied to the first section, and the at least two further closure means applied to the second section may advantageously facilitate further processing of the sausage-shaped products, in particular when two consecutively produced sausage-shaped products are connected by the plait-like portion. For example, the section of the plait-like portion defined by the predefined distance may be slung around a rod-like element, such as a smoking rod, for being stored in a hanging position thereon. Moreover, the predefined distance may provide clearance for a cutting element to pass between the first and second pair of closure clips to sever the plait-like portion.

Alternatively or additionally, the first closing device comprises a first placement tool and a first closing tool, and the second closing device comprises a second placement tool and a second closing tool. Preferably, the first placement tool is configured to receive the at least two closure means for application to the first or downstream section of the plait-like portion and to place the received at least two closure means at the first or downstream section of the plait-like portion. The second placement tool is configured to receive the at least two further closure means for application to the second or upstream section of the plait-like portion and to place the received at least two further closure means at the second or upstream section of the plait-like portion. The first closing tool is configured to close the at least two closure means placed at the first or downstream section of the plait-like portion by the first placement tool. The second closing tool is configured to close the at least two further closure means placed at the second or upstream section of the plait-like portion by the second placement tool. In alternative configurations, each of the first and second placement tool is configured to receive at least one closure means for placement at the first or outer section of the plait-like portion and at least one closure means for placement at the second section or inner section of the plait-like portion. Likewise, each of the first and second closing tool is configured to close the at least two closure means placed at the first or outer and second or inner sections.

At least one of the first placement tool of the first closing device and the first closing tool of the first closing device is reversibly movable towards the other tool. Moreover, at least one of the second placement tool of the second closing device and the second closing tool of the second closing device is reversibly movable towards the other tool. Preferably, the first placement tool and the first closing tool are reversibly movable towards each other, and the second placement tool and the second closing are reversibly movable towards each other.

In a further preferred embodiment of the first aspect of the present invention, the first placement tool comprises a seat for receiving at least a portion of each of the at least two closure means for application to the first section of the plait-like portion. The second placement tool comprises a seat for receiving at least a portion of each of the at least two further closure means for application to the second section of the plait-like portion. Such a preferred embodiment is particularly advantageous for use with non-overlapping first and second sections of the plait-like portion as described above. Alternatively, the seat of the first placement tool receives at least a portion of a first closure means of the first or outer pair of closure means and at least a portion of a first closure means of the second or inner pair of closure means. Correspondingly, the seat of the second placement tool receives at least a portion of a second closure means of the first or outer pair of closure means and at least a portion of a second closure means of the second or inner pair of closure means. Such an alternatively preferred embodiment is particularly advantageous for use with configurations, in which the second section of the plait-like portion is a sub-section of the first section as described above. The seat releasably secures the respective at least two closure means received by the respective placement tool at least until the at least two closure means are placed at the respective section of the plait-like portion. Preferably, the seat of each of the placement tools is a continuous surface.

Alternatively or additionally, the first closing tool comprises an engagement surface for engaging free end portions of each of the at least two closure means placed at the downstream section or at the inner and outer section of the plait-like portion. The second closing tool comprises an engagement surface for engaging free end portions of each of the at least two further closure means placed at the upstream section or at the inner and outer section of the plait-like portion. When the respective closing tool closes the respective at least two closure means placed at a respective section of the plait-like portion, the free end portions of each of the at least two closure means are brought into contact with the engagement surface, such that the free end portions are bent around at least a section of the plait-like portion. In other words, the engagement surface provides a deflection path followed by the free end portions of the prospective at least two closure means when being closed by the respective closing tool.

In further preferred embodiments of the first aspect of the present invention, the seat of the first placement tool and the seat of the second placement tool are each adapted to at least a portion of the shape of the closure means. In other words, the seat secures each of the at least two closure means received in the respective placement tool through form closure. Preferably, the closure means are substantially U-shaped and the seat is formed by a substantially U-shaped continuous recess.

Alternatively or additionally, at least a portion of the engagement surface of the first closing tool and at least a portion of the engagement surface of the second closing tool are each adapted to at least a portion of the shape of the closure means. The portion of the engagement surface adapted to the shape of the closure means provides a receiving zone wherein the free end portions of the closure means are received during closing of the closure means. The portion of the engagement surface adapted to the shape of the closure means guides the free end portions of the closure means received by the receiving zone so as to follow the deflection path provided by the engagement surface during closing of the closure means. Preferably, the closure means are substantially U-shaped and the engagement surface is formed by a substantially U-shaped continuous recess.

Alternatively or additionally, the first placement tool of the first closing device and the second placement tool of the second closing device are coupled to a common clipping arm, also referred to as placement arm. The first closing tool of the first closing device and the second closing tool of the second closing device are coupled to another common clipping arm, also referred to as closing arm. At least one of the placement arm and the closing arm is reversibly movable towards the other arm. Preferably, both of the placement arm and the closing arm are reversibly movable towards each other.

Alternatively or additionally, the first placement tool of the first closing device and the second placement tool of the second closing device form a single, unitary component. Alternatively or additionally, the first closing tool of the first closing device and the second closing tool of the second closing device form a single, unitary component.

Alternatively or additionally, the clipping machine further comprises clip insertion means for inserting at least two closure means into the seat of the first and second placement tool.

In a second aspect of the present invention, preferably combined with the clipping machine of the first aspect, a guide unit for guiding closure means, such as closure clips, from a clip supply to a closing unit of a clipping machine for producing sausage-shaped products, like sausages, is provided. The guide unit is configured to supply at least two closure means to a first closing device of the closing unit of the clipping machine and to supply at least two further closure means to a second closing device of the closing unit of the clipping machine. In particular, the guide unit comprises a first, a second, a third and a fourth output opening, from each of which a closure means is supplied to the respective closing device.

The guide unit of the second aspect of the present invention is particularly advantageous for use in a conventional clipping machine, which may thereby be adapted to apply at least four closure means to a plait-like portion of a sausage-shaped product.

Alternatively or additionally, a plurality of successively arranged closure means are connected to form a clip line along a spooling direction. A closure means forming an end of the first clip line corresponds to the first closure means of the first pair of closure means, and a closure means forming an end of the second clip line corresponds to the second closure means of the first pair of closure means. A closure means forming an end of the third clip line corresponds to the first closure means of the second pair of closure means, and a closure means forming an end of the fourth clip line corresponds to the second closure means of the second pair of closure means. The guide unit further comprises a first guide channel extending along a first clip feeding direction and being configured to guide at least the first clip line and the second clip line to the first closing device, and a second guide channel extending along a second clip feeding direction for guiding at least the third clip line and the fourth clip line to the second closing device.

Alternatively or additionally, the first and second clip feeding direction are adapted to the configuration of the first and second closing devices. In some preferred embodiments, the first and second clip feeding directions are parallel to each other. In more preferred embodiments, the first and second clip feeding directions are parallel and extend in the same direction. In other preferred embodiments, the first and second clip feeding directions are coaxial and extend in opposite directions. In further preferred embodiments, the first and/or second clip feeding directions are generally perpendicular to the feeding direction. In other preferred embodiments, the first and/or second clip feeding directions are generally parallel to the feeding direction. In particular, the first and second clip feeding directions being parallel and extending into the same direction with respect to each other and generally perpendicular to the feeding direction may be beneficial when modifying an existing "R-clip" machine. "R-clips" are substantially U-shaped closure means configured to be successively arranged along a spooling direction to form a clip line, wherein the U-shape is formed by two leg portions extending from a base portion. Each "R-clip" is configured to be connected to an adjacent "R-clip" arranged on the clip line downstream with respect to the spooling direction by one of the leg portions, and configured to be connected to another adjacent "R-clip" arranged on the clip line upstream with respect to the spooling direction by the other one of the leg portions. A clip line comprising of "R-clips" comprises an undulation pattern formed by the U-shaped of successively arranged "R-clips" that is generally perpendicular to the spooling direction.

Alternatively or additionally, a distance element is provided between the first guide channel and the second guide channel. The distance element is configured to maintain a predefined distance between the at least two closure means supplied to the first closing device and the at least two further closure means supplied to the second closing device. In particular, the predefined distance maintained by the distance element corresponds to the predefined distance between the first pair of closure means applied to the first section of the plait-like portion and the second pair of closure means applied to the second section of the plait-like portion discussed in previous sections.

Alternatively or additionally, the first guide channel comprises a first spacer element and the second guide channel comprises a second spacer element. The first spacer element partitions the first guide channel into a first guide lane and a second guide lane. The second spacer element partitions the second guide channel into a third guide lane and a fourth guide lane. The first guide lane is configured to guide the first clip line to the first closing device, the second guide lane is configured to guide the second clip line to the first closing device, the third guide lane is configured to guide the third clip line to the second closing device and the fourth guide lane is configured to guide the fourth clip line to the second closing device.

Alternatively or additionally, the first spacer element is configured to maintain a predefined spacing between the first closure means and the second closure means supplied to the first closing device. The second spacer element is configured to maintain a second predefined spacing between the third closure means and the fourth closure means supplied to the second closing device. In particular, the first and second predefined spacing correspond to the first and second predefined spacing between the first pair of closure means applied to the first section of the plait-like portion and the second pair of closure means applied to the second section of the plait-like portion discussed in previous sections.

Alternatively or additionally, the guide unit further comprises a pivoting axis for pivoting the guide unit. Preferably, the pivoting axis is configured to be aligned at least substantially horizontal when operating the guide unit. Preferably, the pivoting axis is configured to couple the guide unit to a clipping arm of a clipping machine, preferably to the placement arm discussed in previous paragraphs. In other words, the guide unit is configured to be coupled to the clipping arm, such that the guide unit is moved together with the clipping arm, and pivotable relative to the clipping arm. In further preferred embodiments, the guide unit comprises a plurality of coupling hubs. A first subset of coupling hubs is coaxially aligned and configured to define the pivoting axis. A second subset of coupling hubs is configured to couple to a connection element of the clipping machine, wherein the connection element is configured to limit the range of pivoting motion of the guide unit with respect to the clipping arm. Providing the guide unit with coupling hubs may facilitate coupling to a conventional clipping machine for repurposing the conventional clipping machine for application of at least four closure clips.

Preferably, the coupling hubs are configured to provide the guide unit with a pivoting axis and a predefined range of rotation around the pivoting axis. In other words, additionally to the guide unit following the movement of the clipping arm, the guide unit can further be pivoted relative to the clipping arm.

Alternatively or additionally, hold down means, such as a spring, in particular a leaf spring, are provided and configured to releasably engage at least a portion of each of the at least two closure means supplied to the first closing device, and to releasably engage at least a portion of each of the at least two further closure means supplied to the second closing device. Preferably, the hold down means engage the portion of a respective closure means at least until at least a portion of the closure means is received by a respective placement tool of the first or second closing device. Thereby, the risk of improper alignment of closure means supplied to the first and second closing devices is reduced.

Alternatively or additionally, the hold down means are provided at output openings, such as those discussed in previous sections, of the guide unit. The closure means is biased against the hold down means, such as by the insertion means discussed in previous sections, when being supplied to the closing device, at least until a portion of the closure means is received by the respective placement tool.

In a further preferred embodiment of the first or second aspect of the present invention, biasing the closure means against the hold down means pivots the guide unit around its pivoting axis.

In a third aspect of the present invention, preferably combined with the first and/or second aspect of the present invention, a method for producing sausage-shaped products, like sausages, containing a filling material in a tubular or bag-shaped packaging casing is provided. The method comprises filling at least a portion of a tubular or bag-shaped packaging casing with filling material, forming a plait-like portion substantially free of filling material from the tubular or bag-shaped packaging casing filled with filling material, and applying at least two closure means, such as closure clips, to a first section of the plait-like portion and applying at least two further closure means to a second section of the plait-like portion. In other words, a total of at least four closure means are applied to the plait-like portion. In a preferred embodiment, the plait-like portion remains stationary or is maintained in a fixed position at least for the duration of the application of the at least four closure means to the corresponding sections of the plait-like portion.

In an alternatively or additionally preferred embodiment of the third aspect of the present invention the at least two closure means applied to the first section of the plait-like portion, and the at least two further closure means applied to the second section of the plait-like portion are applied substantially simultaneously. In alternatively preferred embodiments, the at least four closure means are applied sequentially in a series of at least two closing steps. In particularly preferred embodiments, at least one, preferably at least two, closure means are applied to any of the first or second section in a first closing step and at least one, preferably at least two, further closure means are applied to any of the first or second section in a subsequent closing step after the first closing step has been completed, preferably in a second step. It has to be understood however, that the number of closing steps can be greater than two, for example three, four, five or six. In particular, the number of closing steps is adapted according to the number of closure means to be applied. More particularly, each individual closure means is applied in a separate closing step, for example a first closure means in a closing first step, a second closure means in a second closing step and so on.

Alternatively, any suitable sub-set of closure means of the total of at least four closure means is applied in a corresponding closing step. For example, two closure means are applied in a first closing step, a third closure means is applied in a subsequent second closing step and a fourth closure means is applied in a subsequent third closing step for a total of four closure means applied in three closing steps.

Alternatively or additionally, sub-sets, such as pairs, of the total of at least four closure means are sequentially applied in symmetry with respect to a center of the plait-like portion. Preferably or alternatively, in a first closing step, an outer pair of closure means is applied to the outer section of the plait-like portion and, in a second closing step, an inner pair of closure means is applied to an inner section of the plait-like portion.

In particularly or alternatively preferred embodiments, at least four closure means are simultaneously placed on the plait-like portion in a first placement step, and the at least four closure means are then closed in any suitable number of closing steps as described above. Preferably, at least four closure means are placed on the plait-like portion in a first placement step and subsequently, a first pair of closure means is closed in a first closing step and a second pair of closure means is closed in a second closing step following the first closing step. Alternatively or additionally, the at least four closure means are simultaneously placed on the plait-like portion by a placement tool and subsequently a first pair of closure means is closed by a closing tool in a first closing step and a second pair of closure means is closed by a closing tool in a second closing step. Preferably, a first closing tool closes the first pair of closure means in the first closing step and a second closing tool closes the second pair of closure means in the second closing step. Alternatively, a single closing tool closes the first pair of closure means in the first step and subsequently closes the second pairs of closure means in the second closing step.

Alternatively or additionally, a suspension element, such as a suspension loop, is provided to the at least two closure means being applied to the first section of the plait-like portion. Alternatively or additionally, a suspension element is provided to the at least two further closure means being applied to the second section of the plait-like portion. Providing a suspension element to at least two closure means may advantageously contribute to distributing the load applied by the suspension element to the sausage-shaped product.

Alternatively or additionally, the closure means is applied to a respective section of the plait-like portion by bending free end portions of the closure means around at least a portion of a periphery of the plait-like portion. Preferably, the free end portions are bent so that, when the closure means are applied to the plait-like portion, the free end portions of a closure means are substantially aligned with respect to each other. The alignment is such that the free end portions of the closure means do not overlap in a direction parallel to a longitudinal axis of the sausage-shaped product. In further preferred embodiments, the free end portions of a closure means abut each other when the closure means is applied.

In a fourth aspect of the present invention, preferably combined with the first and/or second and/or third aspect of the present invention, a closing assembly for use with a clipping machine for producing sausage-shaped products is provided. The closing assembly comprises coupling means, such as a connection portion, for removably attaching the closing assembly to a clipping machine, preferably of any of the embodiments described above. The closing assembly may for example be attachable to a drive unit of the clipping machine, such that the closing assembly as a hole is moveable, preferably via a clipping arm of the clipping machine, such as a placement arm or a closing arm. In other embodiments, the closing assembly is attachable to a stationary section of the clipping machine. The closing assembly further comprises at least one fixed closing tool and at least one moveable closing tool, the moveable closing tool being moveable between an engaged position and a disengaged position. When in the engaged position, the at least one moveable closing tool is in alignment with the at least one fixed closing tool. When in the disengaged position, the at least one moveable closing tool is out of alignment with the at least one fixed closing tool. In other words, the closing assembly has at least two different configurations, a first configuration in which the at least one moveable closing tool is in alignment with the fixed closing tool and a second configuration in which the at least one moveable closing tool is out of alignment with the fixed closing tool.

The afore-described closing assembly is particularly advantageous because by bringing the at least one moveable closing tool and the at least one fixed closing tool into and out of alignment, the total number of closure means that can be closed with the closing assembly in a single closing step can be varied as desired. In other words, the number of closure means that can be closed by the closing assembly in the first configuration is desirably different from the number of closure means that can be closed by the closing assembly in the second configuration.

It has to be understood that the closing assembly of the fourth aspect can take any desired arrangement with respect to the number of moveable closing tools and fixed closing tools. It is thus clear that in some embodiments the number of fixed closing tools is equal to the number of moveable closing tools, whereas in other embodiments the number of fixed closing tools is different from the number of moveable closing tools. Moreover, when a different number of fixed closing tools than moveable closing tools is provided, the number of fixed closing tools may be greater or smaller than the number of moveable closing tools. In a particularly preferred embodiment, the closing assembly comprises one fixed and two moveable closing tools, which are independently moveable between their respective engaged and disengaged positions. It is immediately apparent that the closing assembly thus has four different configurations; both moveable closing tools in the disengaged position, both moveable closing tools in the engaged position, a first closing tool in the engaged position and a second moveable closing tool in the disengaged position and vice versa. In any of these configurations, the number of closure means that can be closed with the closing assembly in a single step is different, depending on the number of closure means each of the fixed and moveable closing tools is individually configured to close as described below.

Alternatively or additionally, the at least one fixed and/or the at least one moveable closing tool are configured to close at least one respective closure means such as a closure clip placed on a plait-like portion of a sausage-shaped product to be produced. It has to be understood however, that any of the at least one fixed and the at least one moveable closing tool can be configured to close more than one respective closure means, such as two, three, four or five closure means. Moreover, the number of closure means that the at least one fixed closing tool is configured to close need not be equal to the number of closure means the at least moveable closing tool is configured to close. For example, in one embodiment, at least one moveable closing tool is configured to close two closure means and the at least one fixed closing tool is configured to close one closure means. The advantageous flexibility provided with respect to the varying number of closure means that can thereby be closed in a single closing step is immediately apparent.

Alternatively or additionally, the at least one fixed and/or the at least one moveable closing tool are any of the closing tools described above. Alternatively or additionally, the fixed and the moveable closing tools each comprise a respective engagement surface configured for engaging at least a portion, preferably a free end, of at least one closure means such as a closure clip. More preferably, when in alignment, the engagement surface of the at least one moveable closing tool and the engagement surface of the at least one fixed closing tool face substantially in the same direction. Alternatively or additionally, when in alignment, the engagement surface of the at least one moveable closing tool and the engagement surface of the at least one fixed closing tool are both oriented so as to be brought into engagement with the respective portions of the respective at least one closure means.

Alternatively or additionally, when out of alignment, the engagement surface of the at least one moveable closing tool and the engagement surface of the at least one fixed closing tool face in different directions. Alternatively or additionally, when out of alignment, the engagement surface of the at least one moveable closing tool or moveable engagement surface is oriented to not come into engagement with the at least a portion of the at least one closure means to be engaged by the second closing tool, when the engagement surface of the at least one fixed closing tool or fixed engagement surface comes into engagement with the at least a portion of the at least one closure means to be engaged by the first closing tool. Alternatively or additionally, the engagement surface of the at least one fixed closing tool or fixed engagement surface is configured to substantially face in a direction of movement of the closing arm when the closing assembly is attached thereto. Alternatively or additionally, when out of alignment, the engagement surface of the at least one moveable closing tool is configured to face in a direction substantially different from the direction of movement of the closing arm when the closing assembly is attached thereto.

Preferred embodiments of the present invention will be described in the following together with the drawings listed below. Further advantages, implementations and embodiments of the first, second and third aspect of the present invention will be detailed therein. The following description together with the drawings are therefore fully referenced for the purpose of detailing the previous description of the first, second and third aspect of the present invention. It has to be understood that any of the individual features described in the following and/or shown in the drawings can be combined with, or replace corresponding features of any of the embodiments of the first, second or third aspect discussed above. Moreover, it has to be understood that the fact that a certain feature is recited by an independent claim and/or the description of any of the first, second or third aspects of the present invention, is not sufficient to indicate whether or not the feature is an essential feature.

If not indicated otherwise, expressions such as "up", "down", "above", "below", "on top", "beneath" or analogous expressions for a relative spatial position along a vertical or horizontal axis are defined relative to a viewer's perspective on the drawings, with the depicted orientation of the machine substantially coinciding with the upright position of the machine during operation, wherein the machine is typically set up on a floor. If not indicated otherwise, expression such as "down", "below", "beneath" or analogous expressions relate to a relative position closer to the floor, and "up", "above", "on top" or analogous expressions relate to a relative position further away from the floor.

If not indicated otherwise, expressions such as "in front", "behind", "left" and "right" or analogous expressions for a spatial position relative to a viewer are defined relative to the viewer's perspective view on the drawings, wherein "in front" or analogous expressions relate to a relative position closer to the viewer, and "behind" or analogous expressions relate to a relative position further away from the viewer.

Furthermore, it should be noted that the terms "upstream" and "downstream" refer to a direction in which an object, like filling material or clip lines are conveyed for the production of sausage-shaped products.

Figure 2:
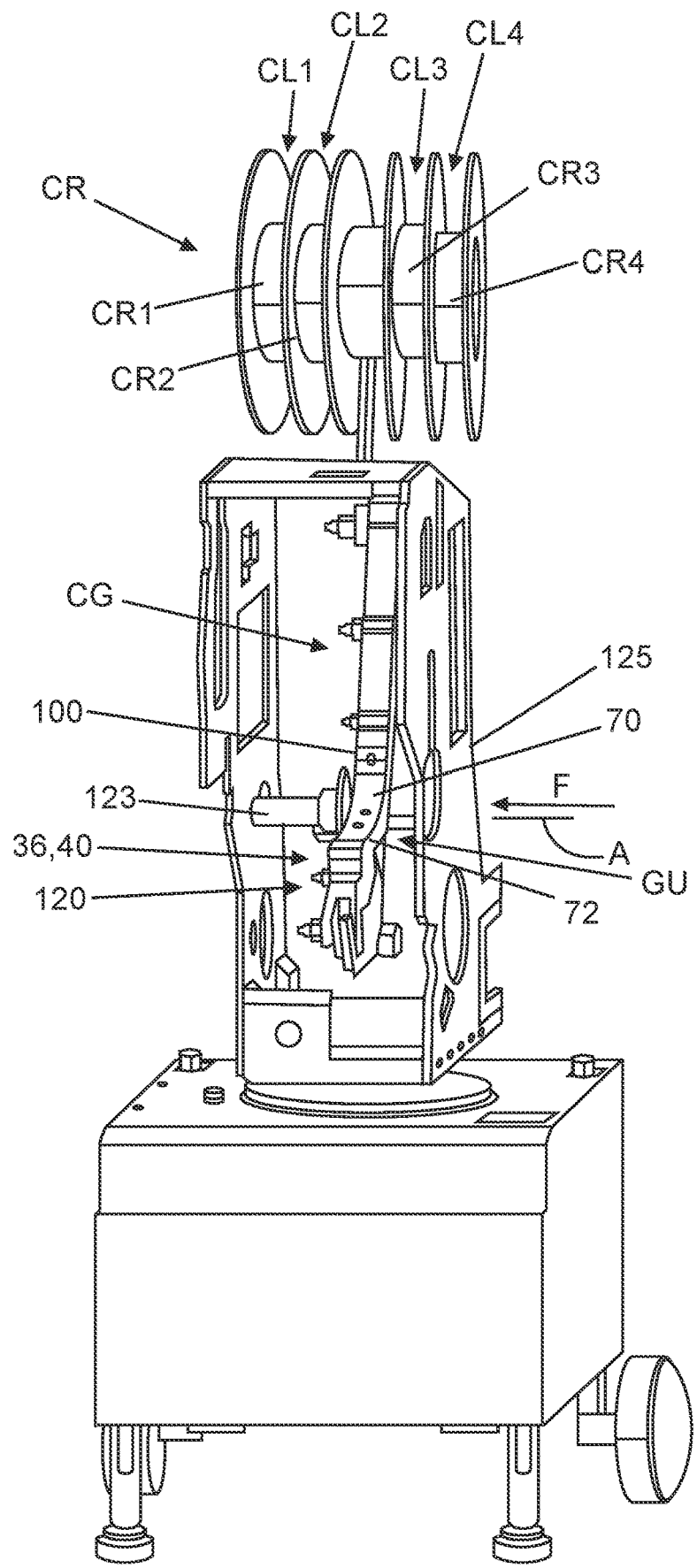
Figure 3A:
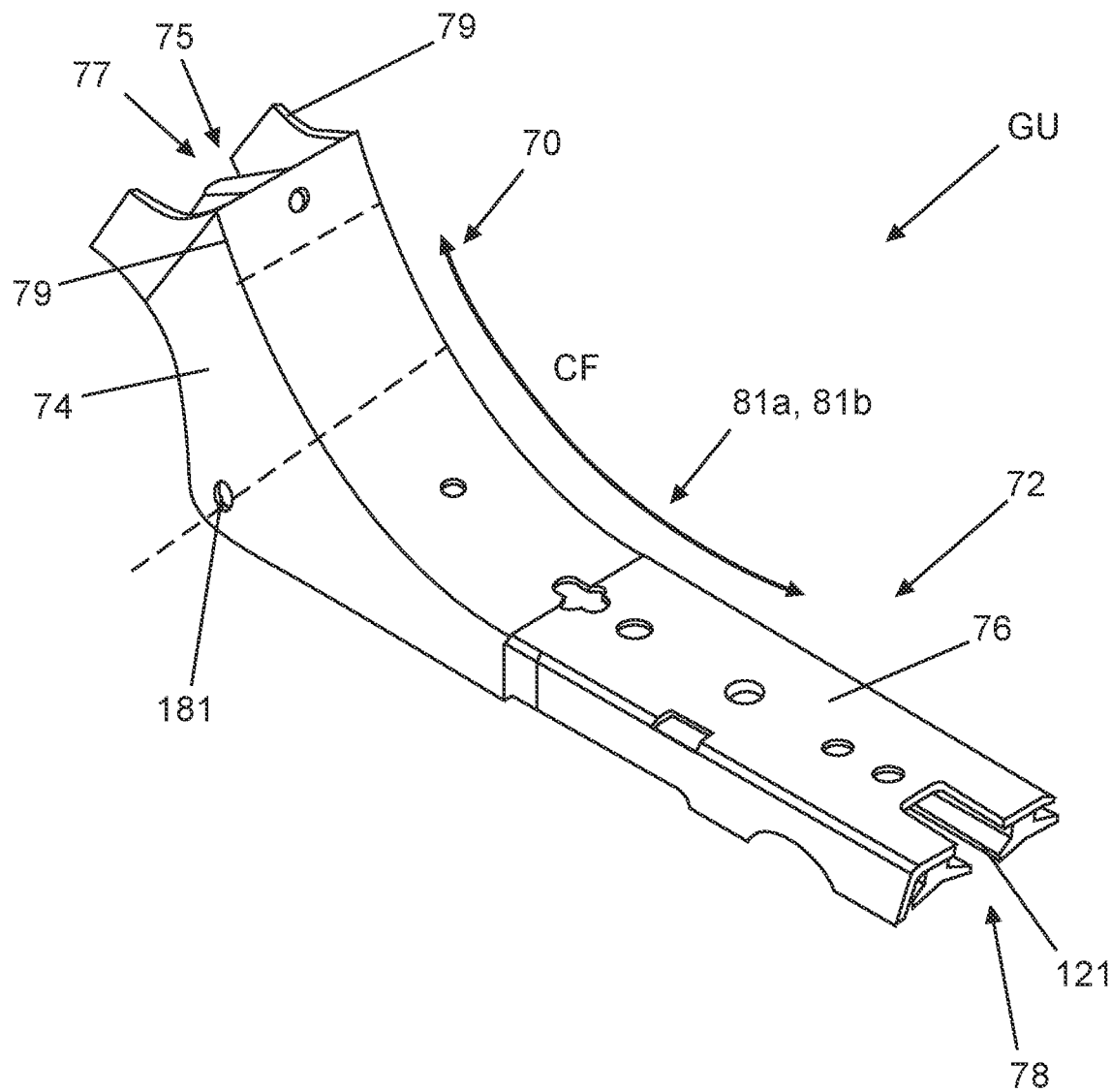
Figure 3B:
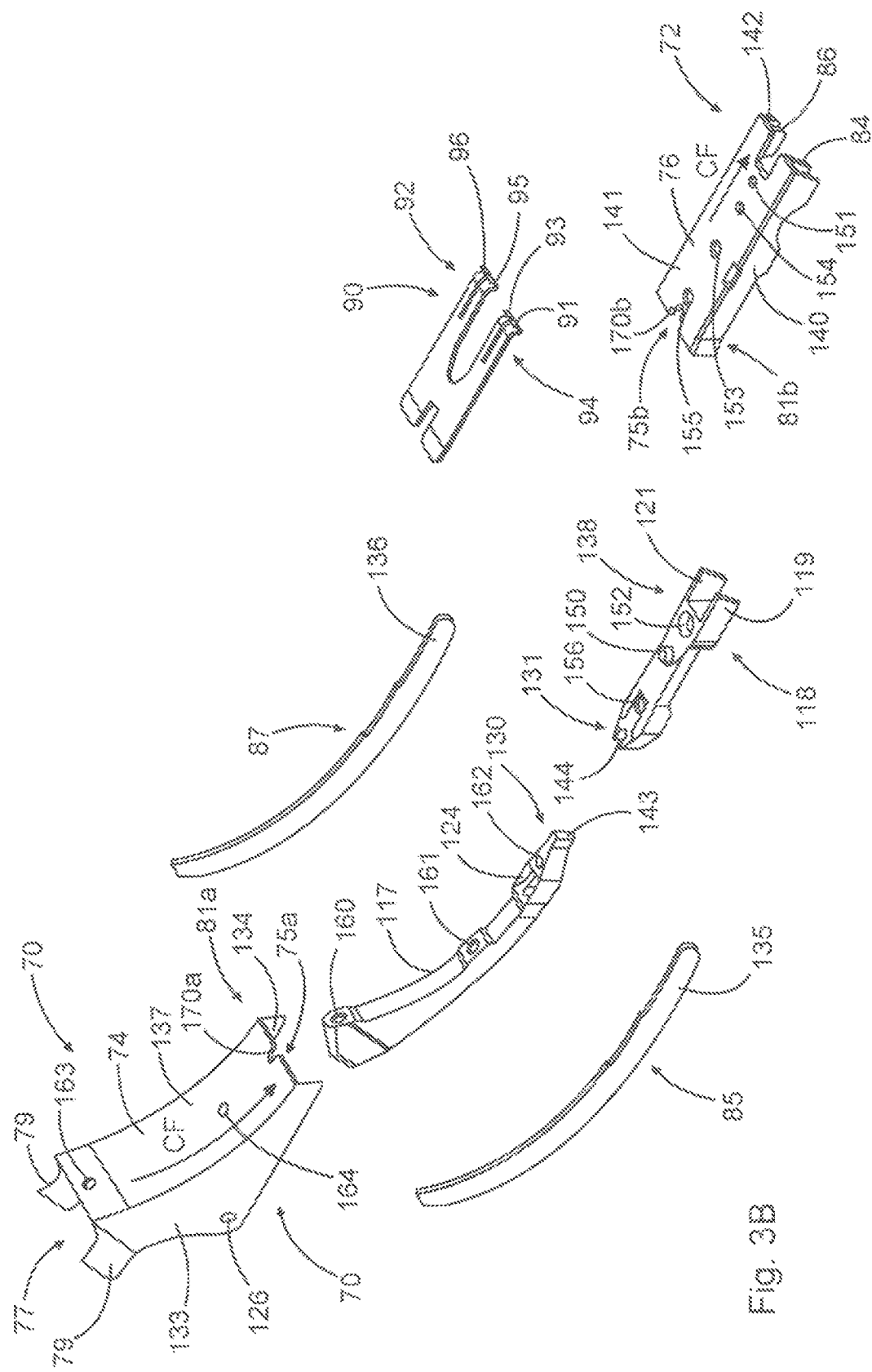
Figure 4A:
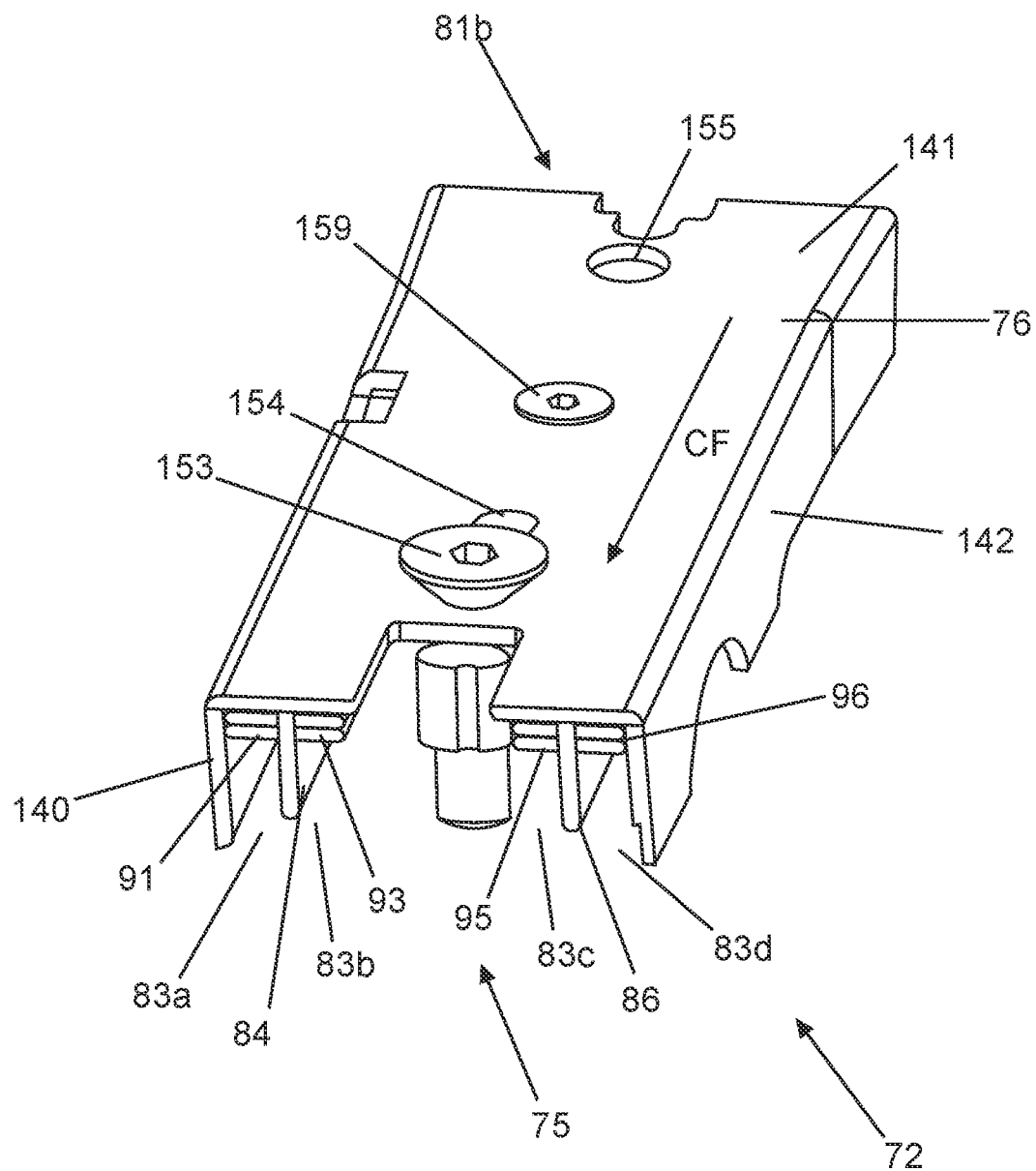
Figure 4B:
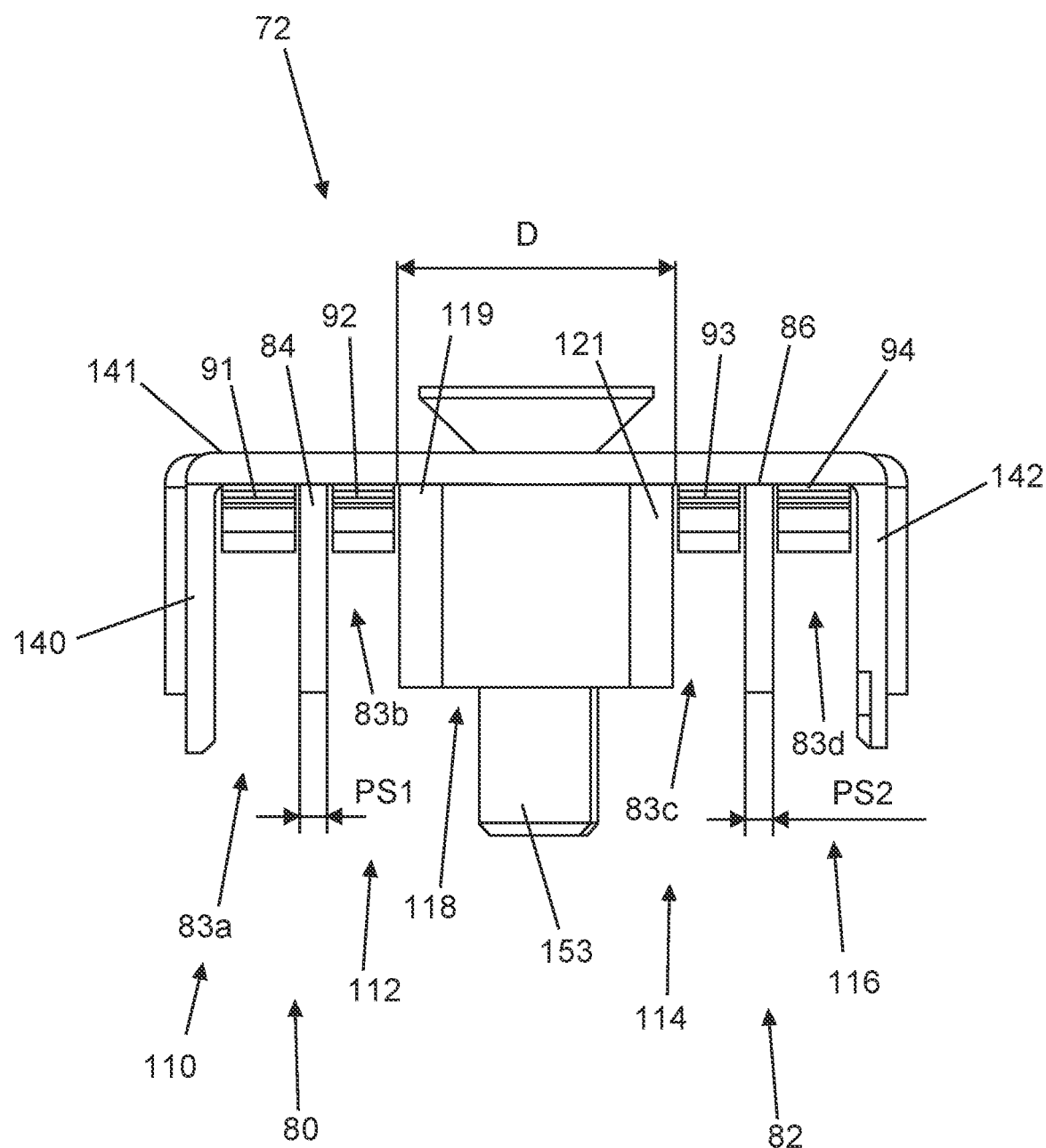
Figure 5A:
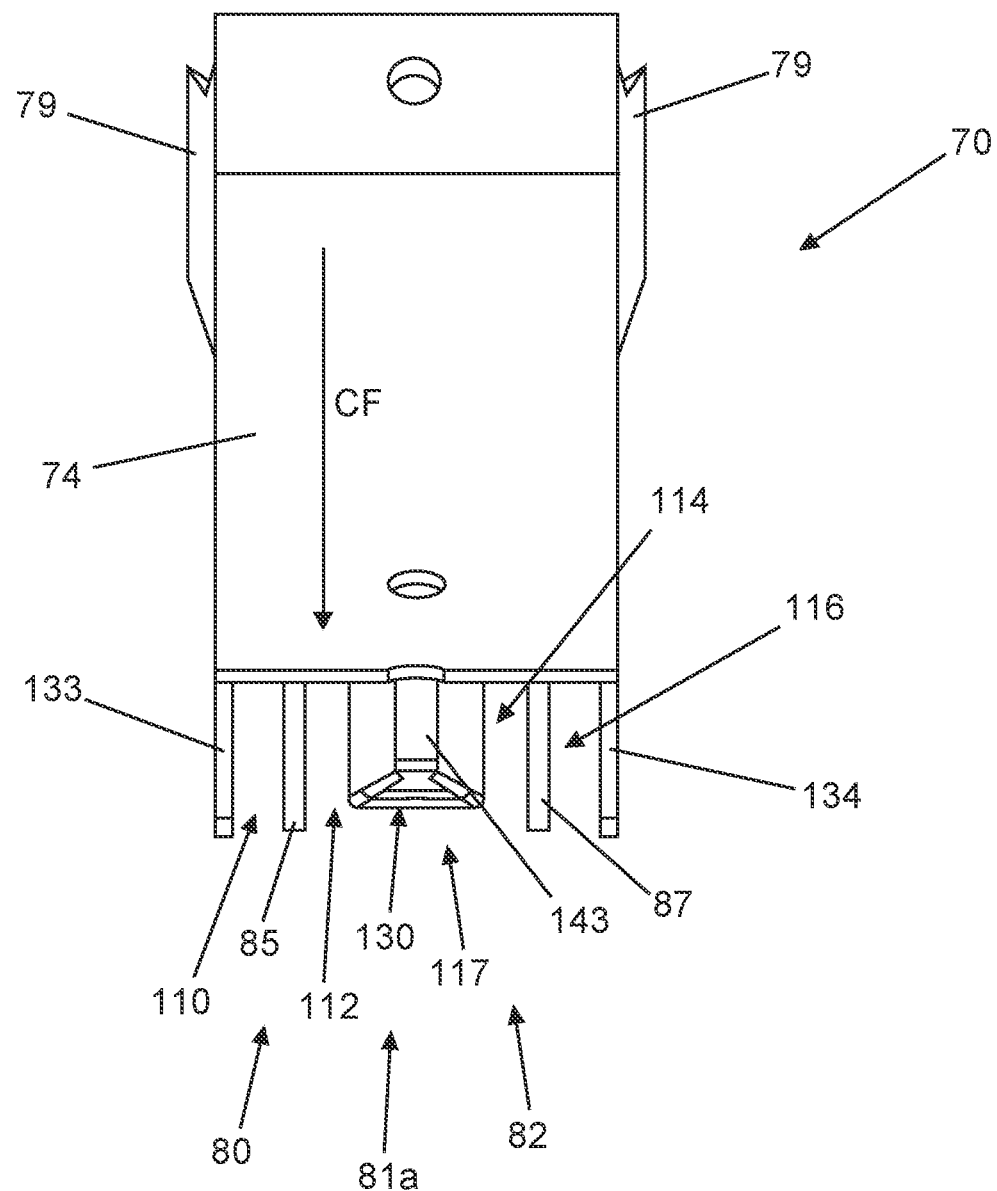
Figure 5B:
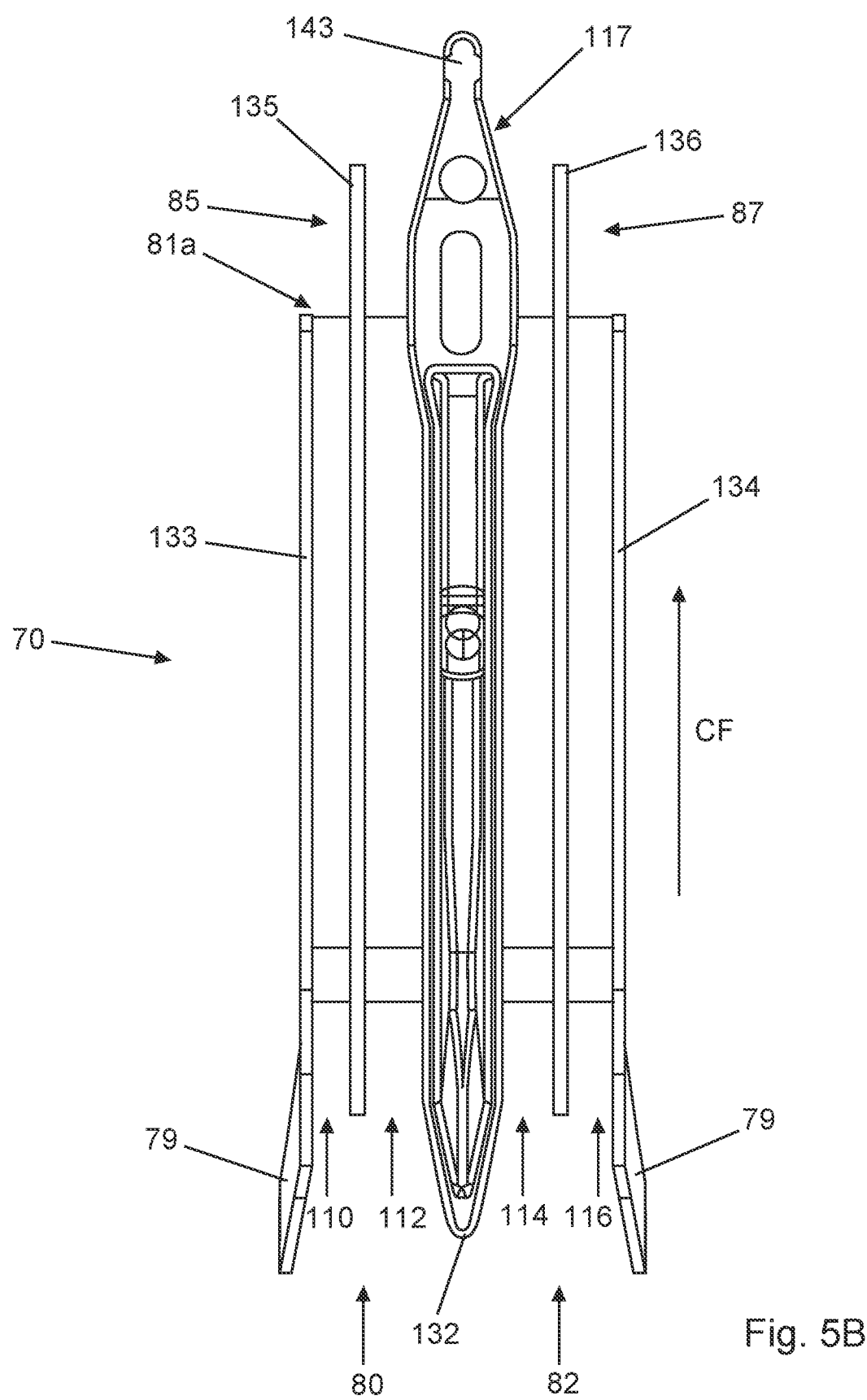
Figure 6:
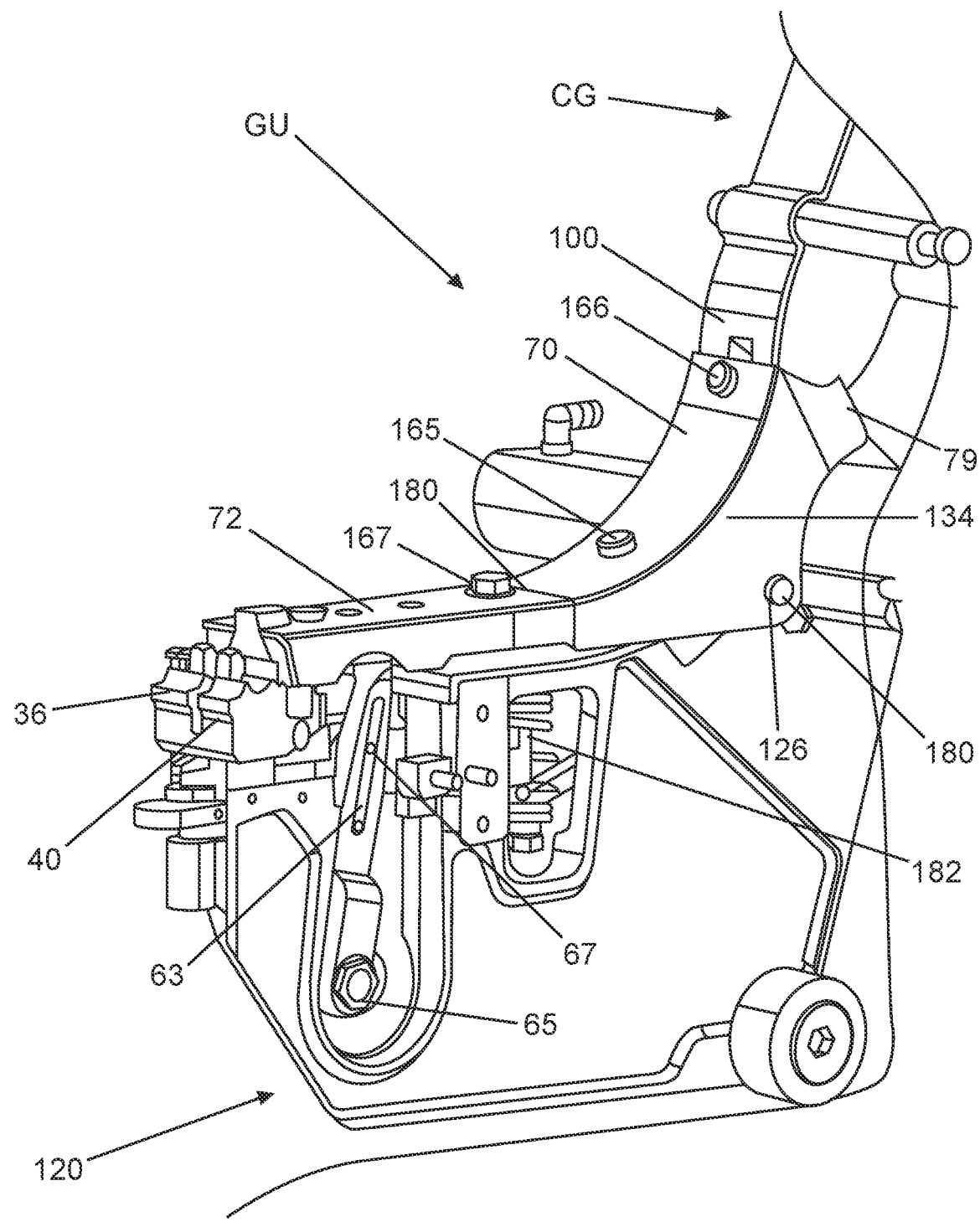
Figure 7:
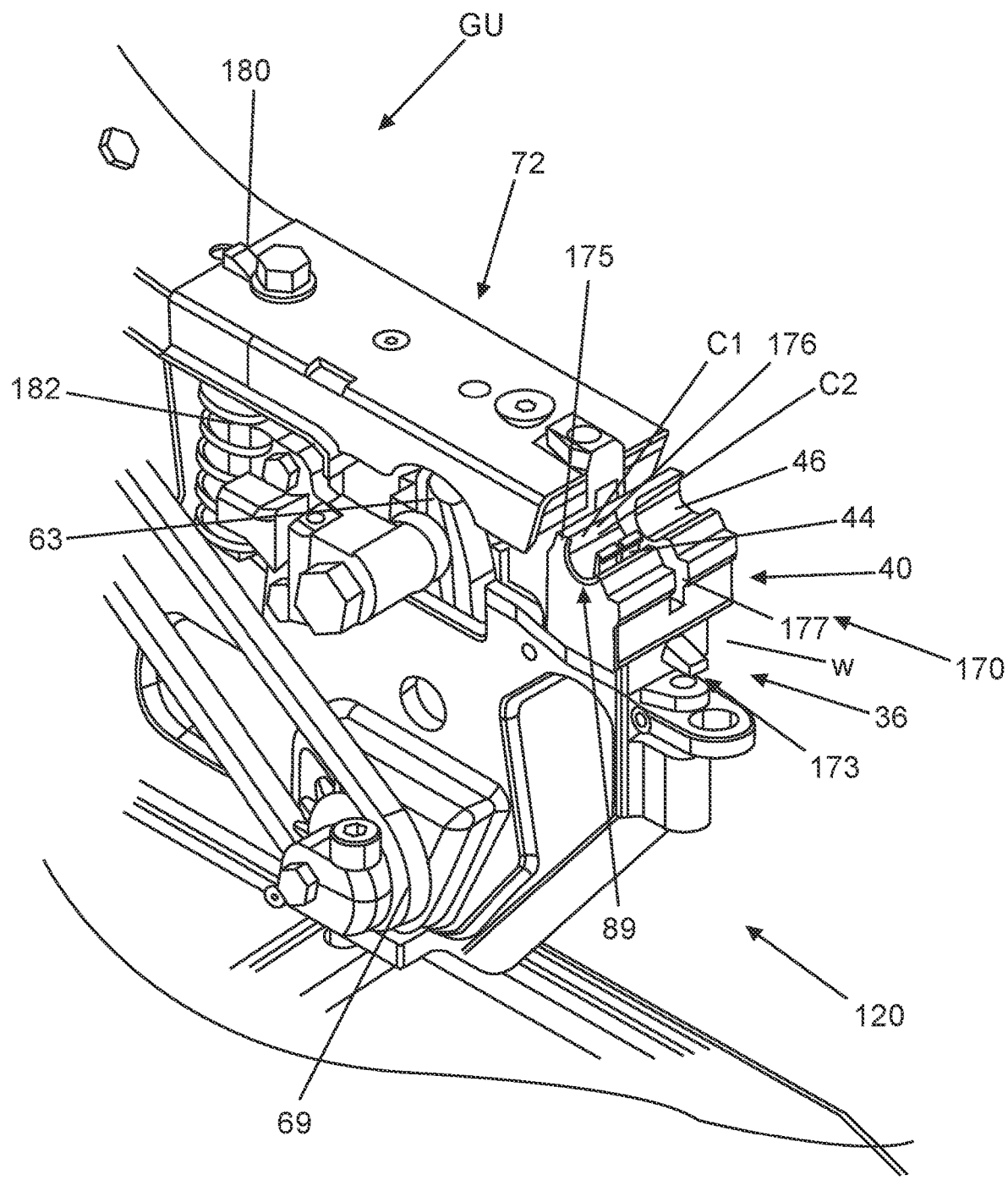
Figure 8A:
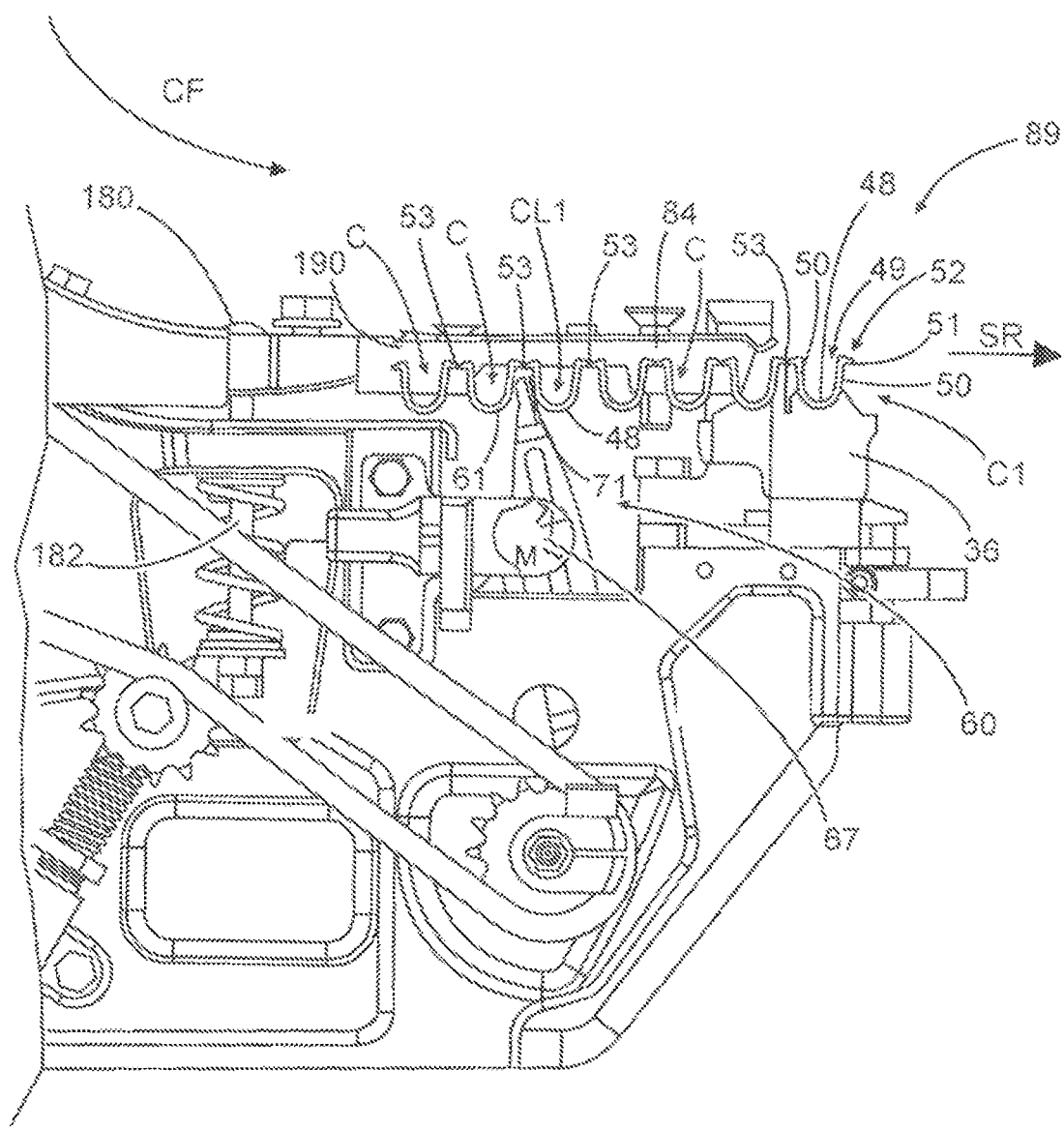
Figure 8B:
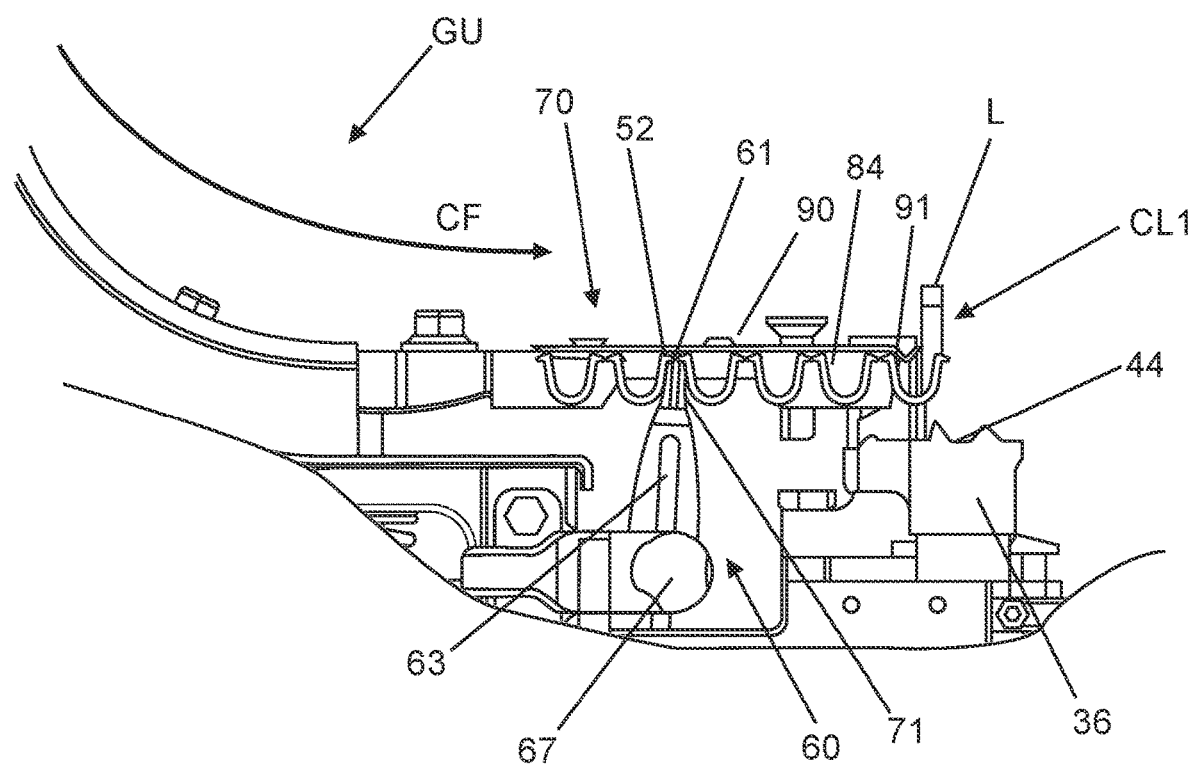
Figure 8C:
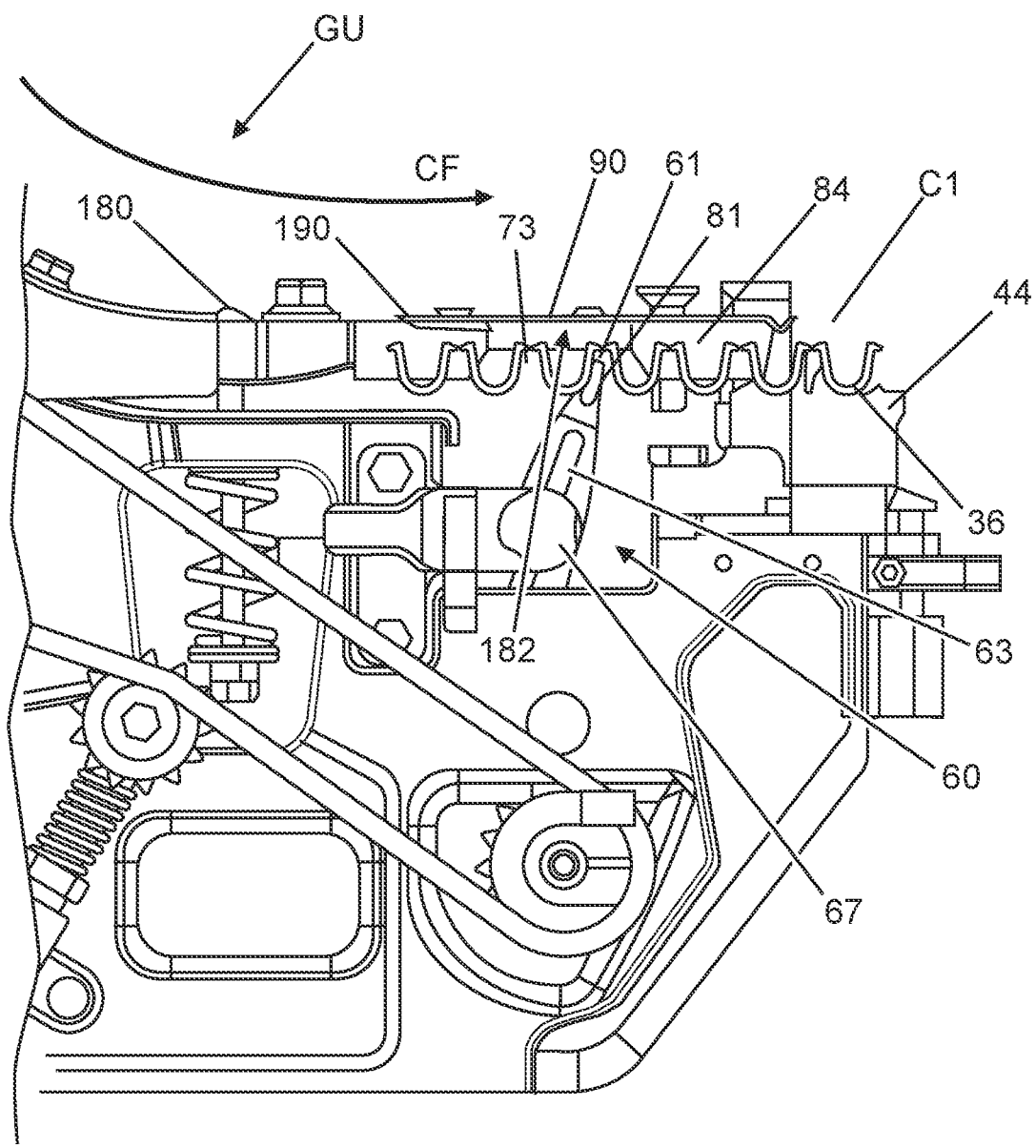
Figure 9:
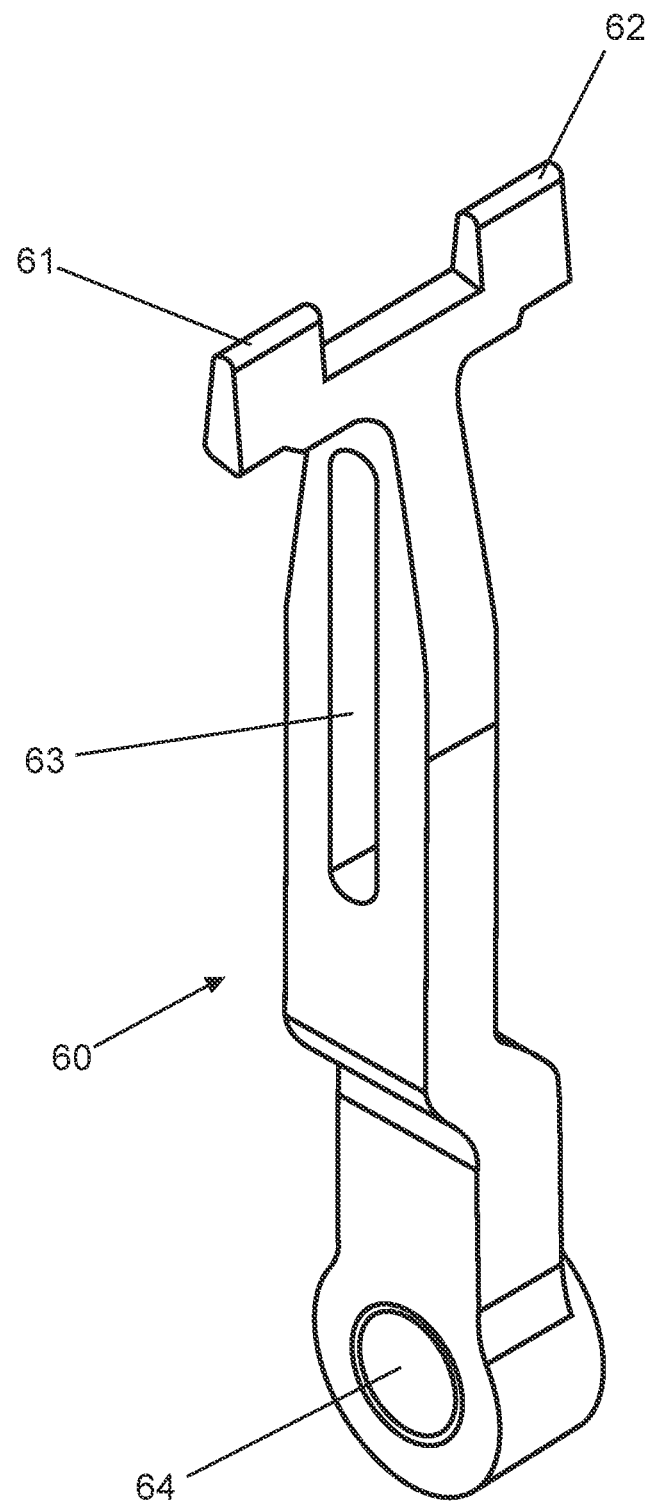

In the drawings:

FIG. 1A: is a schematic view of a clipping machine according to the present invention;

FIG. 1B: is a schematic detail of a plait-like portion of a sausage-shaped product;

FIG. 2: is a perspective view of an embodiment of a clipping machine according to the present invention;

FIG. 3A: is a perspective view of a guide unit according to the present invention;

FIG. 3B: is an exploded view of the guide unit of FIG. 3A;

FIG. 4A: is a perspective view of a redirection portion of a guide unit according to the present invention;

FIG. 4B: is a frontal view of the redirection portion of FIG. 4A;

FIG. 5A: is a frontal view of a feeder portion of a guide unit according to the present invention;

FIG. 5B: is a bottom view of the feeder portion of FIG. 5A;

FIG. 6: is a detailed view of a placement arm of the clipping machine of FIG. 2;

FIG. 7: is another detailed view of the placement arm of FIG. 6;

FIG. 8A: is a detailed view of a placement arm of a clipping machine according to the present invention with an insertion arm in a first position;

FIG. 8B: is a detailed view of the placement arm of FIG. 8A with the insertion arm in a second position;

FIG. 8C: is a detailed view of the placement arm of FIG. 8A with the insertion arm in a third position;

FIG. 9: is a perspective view of an insertion arm of a clipping machine according to the present invention; and FIG. 10A is a perspective view of a closing assembly according to the present invention in a first configuration;

FIG. 10B is a perspective view of the closing assembly of FIG. 10A in a second configuration.

It has to be understood that while the following description generally discusses an embodiment of the inventive clipping machine, features and advantages thereof also apply to the inventive method and the inventive guide unit.

A clipping machine CM for preferably continuously producing sausage-shaped products S1, S2 is shown in FIG. 1A. Filling means 1 are arranged upstream of the clipping machine CM with respect to feeding direction F, wherein filling means 1 comprise a cylindrical filling tube 2 having a longitudinally extending central axis A and being made of a suitable material, like stainless steel. A tubular packaging casing M made of a thin sheet material is stored on filling tube 2 in a shirred form. Clipping machine CM comprises gathering means 10, preferably movable in a vertical plane, for gathering the filled tubular packaging casing M and for forming a plait-like portion P thereto which are arranged downstream filling tube 2. Clipping machine CM also comprises a closing unit 30, which comprises a first closing device 32 and a second closing device 34. Plait-like portion P is at least approximately free of filling material.

First closing device 32 and second closing device 34 are each configured to apply at least two closure means, such as closure clips C, to the same plait-like portion P for closing filled tubular packaging casing M. First closing device 32 comprises a first placement tool 36 and a first closing tool 38. Second closing device 34 comprises a second placement tool 40 and a second closing tool 42. In the shown embodiment of clipping machine CM, first placement tool 36 is reversibly movable, preferably in a vertical plane, toward a first section P1 of plait-like portion P to simultaneously place two closure clips, first closure clip C1 and second closure clip C2, on first section P1. First section P1 corresponds to a rear end of a first sausage-shaped product S1 just produced. Second placement tool 40 is reversibly movable, preferably in a vertical plane, toward a second section P2 of plait-like portion P to simultaneously place two further closure clips, third closure clip C3 and fourth closure clip C4, on second section P2. Second section P2 corresponds to a front end of a second sausage-shaped product S2, which is to be produced after first sausage-shaped product S1. An alternative arrangement with regard to the sections of plait-like portion P will be detailed below with respect to FIG. 1B.

First closing tool 38 is reversibly movable, preferably in a vertical plane, toward first section P1 to close first and second closure clips C1, C2 placed at first section P1 by first placement tool 36. Second closing tool 42 is reversibly movable, preferably in a vertical plane, toward second section P2 to close third and fourth closure clips C1, C4 placed at second section P2 by second placement tool 48.

It has to be understood that clipping machine CM may be provided with a control unit for controlling operation of the components of clipping machine CM.

As further can be inferred from FIG. 1A, clipping machine CM can be coupled to filling means 1 comprising horizontally arranged filling tube 2 that has a left end facing gathering means 10 and a right end coupled to a filler arrangement (not shown in FIG. 1A) including a pump for feeding filling material through filling tube 2 in a feeding direction F into tubular packaging casing M.

A casing brake assembly 4 is arranged on filling tube 2 in the vicinity of the left end of filling tube 2 in order to control the movement or pull-off speed of tubular packaging casing M when pulled-off from filling tube 2 resulting from the filling pressure of the filling material, by applying a frictional force to tubular packaging casing M.

Positioned immediately downstream with respect to feeding direction F, the left end of filling tube 2, closing unit 30 is arranged and coaxially aligned with filling tube 2. Gathering means 10 include a first displacer unit 12 and a second displacer unit 14, each including a pair of displacer elements, wherein first displacer unit 12 is positioned downstream second displacer unit 14 with respect to feeding direction F. First and second placement tools 36, 40 and first and second closing tools 38, 42 of first and second closing device 32, 34 of closing unit 30 are positioned between first and second displacer units 12, 14 for applying at least four closure clips C to plait-like portion P.

Furthermore, for discharging a sausage-shaped product, such as sausage-shaped product S1 just produced in clipping machine CM, downstream closing unit 30, a transportation device preferably in form of a belt conveyor 16 is arranged, comprising a conveyor belt 18 and guide rollers 20. The transportation direction of belt conveyor 16 coincides with feeding direction F. The height of the upper conveyor belt section of belt conveyor 16 is aligned to the lower side of sausage-shaped product S1 just produced and being discharged from clipping machine CM.

In the embodiment of FIG. 1A, a front end 24 of sausage-shaped product S1 just produced is closed with a single closure clip C, which has not been applied by the clipping machine CM, but is provided pre-applied to the front end of tubular packaging casing M and inserted into clipping machine CM upon beginning production of sausage-shaped products S1, S2. It has to be understood that in the depicted embodiment all subsequently produced sausage-shaped products can comprise two closure clips C applied to their front end and two further closure clips C applied to their rear end. In principle, it is also possible that the front end of sausage-shaped product S1 just produced is also closed with two clips C.

A schematic view of a detail of FIG. 1A, showing plait-like portion P formed between sausage-shaped products S1 and S2 is depicted in FIG. 1B. Four closure clips C1, C2, C3, C4 are applied to plait-like portion P. A dashed line between second clip C2 and third clip C3, extending substantially perpendicular to longitudinal axis A, represents cutting plane CP along which plait-like portion P can be severed (e.g. cut) to separate first sausage-shaped product S1 just produced from sausage-shaped product S2 to be produced. In the depicted embodiment, cutting plane CP also forms a plane of symmetry regarding the arrangement of clips C1, C2, C3 and C4 on plait-like portion P. With regard to cutting plane CP, first clip C1 is symmetric to fourth clip C4 and second clip C2 is symmetric to third clip C3.

As discussed above, a first section P1 of plait-like portion P can be a section at which first clip C1 and second clip C2 are placed, and a second section P2 can be a section at which third clip C3 and fourth clip C4 are placed. In the depicted embodiment, first section P1 is located at an upstream end of first sausage-shaped product S1 and second section P2 is located at a downstream end of second sausage-shaped product S2. In other words, first and second sections P1 and P2 are located on different sides of cutting plane CP. First section P1 can thus also be referred to as downstream section P1 and second section P2 can thus also be referred to as upstream section P2 referred to filling direction F.

As described above in conjunction with FIG. 1A, first and second clips C1, C2 may be applied to downstream section P1 by first closing device 32 as a first or downstream pair of closure clips C. Likewise, third and fourth clips C3, C4 may be applied to upstream section P2 by second closing device 34 as a second or upstream pair of closure clips C. However, the present invention is not limited to such a consecutive arrangement of first and second sections. FIG. 1B illustrates an alternative configuration wherein a second or inner section P2* of plait-like portion P is a sub-section of a first or outer section P1*. Second or inner section P2* corresponds to a section of plait-like portion P to which second and third closure clips C2, C3 are applied, and thus crosses cutting plane CP. In other words, second or inner section P2* includes portions of the upstream end of first sausage-shaped product S1 as well as of downstream end of second sausage-shaped product S2. First or outer section P1* corresponds to a section of plait-like portion P to which first and fourth clips C1, C4 are applied and thus fully encompasses second section P2*. The afore described definition of outer and inner section P1*, P2* is particularly helpful to illustrate an alternative embodiment of clipping machine CM, which will be described below, comprising first closing device 202 configured to apply, preferably simultaneously, first and fourth clips C1, C4 to outer section P1* as a first or outer pair of clips C, and further comprises second closing device 204 configured to apply, preferably simultaneously, second and third clips C2, C3 to inner section P2* as a second or inner pair of clips C. In some embodiments, the first or outer pair of clips C1, C4 is applied to the outer section P1* after the second or inner pair of clips C2, C3 has been applied to inner section P2*. In other embodiments, the second or inner pair of clips C2, C3 is applied to inner section P2* after the first or outer pair of clips C1, C4 has been applied to outer section P1*.

FIG. 2. shows a perspective view of an embodiment of a clipping machine CM. A guide unit GU is coupled to a placement arm 120 of clipping machine CM. Detailed views of placement arm 120 are shown in FIGS. 6 and 7 which will be explained below. Placement arm 120 is reversibly movable, preferably in a vertical plane, toward plait-like portion P between a receiving position depicted in FIGS. 2, 6 and 7 and a placement position for placing clips C1, C2, C3, C4 at plait-like portion P. For illustrative purposes, plait-like portion P is not depicted in FIGS. 2, 6 and 7, but is located above placement tools 36, 40 as seen in FIG. 1A and indicated by longitudinally extending central axis A and feeding direction F marked in FIG. 2. Movement of placement arm 120 is effected by oscillating rotation around axis 123 coupled to housing 125 of clipping machine CM. Clipping machine CM further comprises closing arm 122, comprising closing tools 38, 42 for closing closure clips C1, C2, C3, C4 placed at plait-like portion P by placement arm 120. For illustrative purposes, closing arm 122 is not depicted in FIGS. 2, 6 and 7, but is located above placement arm 120 as depicted in FIG. 1A. Similar to placement arm 122, closing arm 120 is reversibly movable, preferably in a vertical plane, towards plait-like portion P placed between placement tools 36, 40 and closing tools 38, 42. Movement of 122 is also affected by oscillating rotation around axis 123 coupled to housing 125 of clipping machine CM. It has to be understood that the configuration of placement arm 122 is generally similar to that of placement arm 120, albeit placement arm 122 does not comprise a guide unit GU.

In the embodiment depicted in FIG. 2, clipping machine CM generally shares many features of conventional clipping machines configured for the application or "R-clips", in particular those of those sold as "FCA" series by Poly-clip System GmbH & Co. KG. The general working principle of depicted clipping machine CM and its components is readily derivable from the figures. For further details and information, it is referred to the relevant state of the art.

FIG. 3A depicts an embodiment of a guide unit GU for guiding closure means, such as closure clips C, from a clip supply CR (depicted in FIG. 2) to closing unit 30 of clipping machine CM along a clip feeding direction CF. For each of clips C1, C2, C3, C4, a clip reel with a clip line CL1, CL2, CL3, CL4 of contiguous clips wound thereon is provided as a clip supply CR1, CR2, CR3, CR4. Clips C1, C2, C3, C4 can be identical to each other. In principle, however, it is also possible to use different clips, for example, to use uncoated clips for both inner clips C2, C3 and coated clips for both outer clips C1, C4. Clips C1, C2, C3, C4 can also, or additionally, differ in their respective geometric design, whereby the placement and closing tools 36, 38, 40, 42 are designed accordingly.

Guide unit GU is configured to supply first and second closure clips C1, C2 to first closing device 32 and to supply third and fourth closure clips C3, C4 to second closing device 34. Clip feeding direction CF defines the direction of feeding closure clips C along guide unit GU from clip guide CG to first and second closing device 32, 34. FIG. 3A shows guide unit GU in an assembled state, FIG. 3B shows the components of guide unit GU depicted in an exploded view. In the depicted embodiment, clip feeding direction CF is a common clip feeding direction for each of closure clips C1, C2, C3, C4. Clip feeding direction CF of the depicted embodiment extends in a plane generally perpendicular to longitudinally extending central axis A and feeding direction F. Guide unit GU can be used as a replacement for a guide unit of a conventional clipping machine, thus providing the conventional clipping machine with the ability to apply at least four closure clips C to plait-like portion P of sausage-shaped products S1, S2.

As mentioned above, clip supply CR of clipping machine CM as depicted in FIG. 2 comprises four clip reels CR1, CR2, CR3, CR4, with each clip reel configured for storing a respective clip line CL1, CL2, CL3, CL4 thereon. A clip supply of a conventional clipping machine for application of two closure clips to a plait-like portion of sausage-shaped products typically comprise only two clip reels. It may therefore be required to adapt the clip supply of the conventional clipping machine for receiving four clip reels in addition to replacing the conventional guide unit with the inventive guide unit GU, when modifying the conventional clipping machine as discussed above. If applicable, further adaptations, such as in the sensor system and/or the control system of the conventional clipping machine, may then also have to be made.

In the depicted embodiment, guide unit GU comprises a generally curved portion 70 provided as a separate subassembly, also referred to as redirection portion 70, and a generally flat portion 72 provided as a separate subassembly, also referred to as feeder portion 72. As can be inferred from FIGS. 3A and 3B, clip feeding direction CF follows the curved shape of redirection portion 70. The subassemblies of redirection portion 70 and feeder portion 72 are coupled to form guide unit GU as a generally unitary component. Guide unit GU has a receiving end 77 at an upper end of redirection portion 70 and an output end 78 at an end of feeder portion 72 which is opposite redirection portion 70. A channel 75 extends from receiving end 77 to output end 78. As will be discussed in more detail below, a plurality of guide channels 80, 82 are formed therein for guiding clip lines CL1, CL2, CL3, CL4 to closing unit 30. A first portion 75A of channel 75 is formed in redirection portion 70, first portion 75A extends from receiving end 77 to a connection end 81A. A second portion 75B of channel 75 is formed in feeder portion 72, second portion 75B extends from a connection end 81B to output end 78. Connection end 81A of redirection portion 70 and connection end 81B of feeder portion 72 connect first channel portion 75A to second channel portion 75B.

As depicted in FIG. 2, receiving end 77 is configured for receiving four clip lines CL1, CL2, CL3, CL4 stored at clip supply CR and guided by clip guide CG from a top portion of the clipping machine CM, at which clip supply CR is arranged, to a closing region of clipping machine CM, at which guide unit GU, closing unit 30 and gathering means 10 are arranged. Clip guide CG comprises a funnel-like lower end 100 partially protruding into channel 75 of guide unit GU. Receiving end 77 of guide unit GU is configured to receive funnel-like lower end 100 of clip guide CG so that funnel-like end 100 remains received by receiving end 77 over an entire range of angular motion of guide unit GU, when pivoting relative to clip guide GU. In particular, a shape of an outer surface of funnel-like end 100 and a shape of an inner surface of receiving end 77 are adapted to each other, so that a portion in which funnel-like end 100 protrudes into receiving end 77 acts as a knee joint between guide unit GU and clip guide CG.

Output end 78 comprises four output openings 83A, 83B, 83C, 83D, from each of which a closure clip C is supplied to the respective first and second closing device 30, 32. As depicted, inter alia, in FIGS. 8A through 8C, a plurality of successively arranged closure clips C are connected along a spooling direction SR to form a clip line CL, wherein the perspective of FIGS. 8A through 8C only shows clip line CL1. Clip lines CL1, CL2, CL3, CL4 of the depicted embodiment are of a type generally known in the art as "R-clips", wherein a U-shape of the successively arranged closure clips C forms an contiguous undulation pattern that is generally perpendicular to spooling or unwinding direction SR as described in previous sections. The U-shape of closure clips C will be described in more detail hereafter. In FIGS. 8A through 8C, clip lines CL2, CL3 and CL4 are covered from view by clip line CL1. It has to be understood that while the following paragraphs refer to clip line CL1, they fully apply to clip lines CL2, CL3 and CL4 correspondingly.

A closure clip C is substantially U-shaped, comprising a base portion 48 and two leg portions 50 extending generally toward the same side of base portion 48 from opposing ends of base portion 48, and flared end portions 52 arranged at an end of a respective leg portion 50 that is opposite base portion 48. A closure clip C of clip line CL1 is connected to an adjacent downstream closure clip C with respect to spooling direction SR by one of its flared end portions 52 and connected to an upstream closure clip C with respect to spooling direction SR by the other one of its flared end portions 52. Clip lines CL1, CL2, CL3, CL4 of the depicted embodiment are each formed from a monolithic piece of metal wire, with individual closure clips C formed therein by bending respective sections of the wire.

It has to be understood that in different embodiments, guide unit GU can be adapted to supply what is known in the art as "S-clips". "S-clips" are generally U-shaped clips, similar to "R-clips", but are connected by connection portions extending in a spooling direction between base portions of the clips. The spooling direction of "S-clips" is generally perpendicular to the plane formed by leg portions of the U-shaped clips. In such a case, it is further preferred that clip feeding directions CF are adapted, in particular, so as to extend in a plane generally parallel to longitudinally extending central axis A and feeding direction F.

Each closure clip C is configured to be severed from its clip line at severing line 53, which is arranged at respective ends of each of the flared portions 52 and forms a border to adjacent closure clips. When severed from clip line CL1, flared portions 52 form free end portions of closure clip C with free end faces 51 arranged substantially perpendicular to spooling direction SR, wherein free end faces 51 correspond to respective cutting planes formed by severing clip line CL1 at severing line 53. As depicted, inter alia, in FIG. 7, a closure clip C forming downstream end 89 of clip line CL1 with respect to spooling direction SR, corresponds to first closure clip C1 supplied to first closing device 32 by guide unit GU and a closure clip C forming downstream end 89 of clip line CL2 with respect to spooling direction SR corresponds to second closure clip C2 supplied to second closing device 34. In order to provide an unobstructed view of a seat 46 of second placement tool 40 of second closing device 34, clip lines CL3 and CL4 as well as closure clips C3 and C4 are not depicted in FIGS. 6 and 7. It has to be understood, however, that in the operation of clipping machine CM closure clips C3 and C4 arranged at respective downstream ends 89 of clip lines CL3 and CL4 are likewise provided to second closing tool 34, in particular to second placement tool 40.

Referring back to FIGS. 3A and 3B, redirection portion 70 of guide unit GU comprises a housing 74, in the depicted embodiment provided as a sheet metal construction, the inside of which at least partially encloses and thereby forms first channel portion 75A. Centered in first channel portion 75A and extending along clip feeding direction CF a first distance element 117 is provided. First distance element 117 partitions first channel portion 75A into parallel extending first guide channel 80 and second guide channel 82, first guide channel 80 configured for guiding first and second clip line CL1, CL2 to first closing device 32, and guide channel 82 configured for guiding third clip line CL3 and fourth clip line CL4 to second closing device 34. In first channel 80 a first spacer element 85 is provided, partitioning first guide channel 80 into parallel extending first guide lane 110 and second guide lane 112. Likewise, a second spacer element 87 is provided in second guide channel 82, partitioning second guide channel 82 into parallel extending third guide lane 114 and fourth guide lane 116.

FIG. 5A is a frontal view of redirection portion 70 as seen from connection end 81A and depicts how first guide lane 110 is formed between sidewall 133 of housing 74 and first spacer element 85, how second guide lane 112 is formed between first spacer element 85 and first distance element 117, how third guide lane 114 is formed between first distance element 117 and second spacer element 87 and how fourth guide lane 116 is formed between second spacer element 87 and sidewall 134 of housing 74. Top wall 137 of housing 74 covers and forms a top surface of second and first guide channels 80, 82 and guide lanes 110, 112, 114, 116. In the depicted embodiment, a bottom surface of second and first guide channels 80, 82 and guide lanes 110, 112, 114, 116 is uncovered, i.e. accessible from the bottom.

FIG. 5B is a bottom view of redirection portion 70 and depicts how a downstream end portion 135 with respect to clip feeding direction CF of first spacer element 85 extends from connection end 81A of redirection portion 70. Likewise, a downstream end portion 136 with respect to clip feeding direction CF of second spacer element 87 extends from connection end 81A of redirection portion 70. When redirection portion 70 and feeder portion 78 are coupled, downstream end portions 135 and 136 protrude into second channel portion 75B of feeder portion 72, thereby forming at least a portion of guide lanes 110, 112, 114, 116 in feeder portion 72. Guide lanes 110, 112, 114, 116 extend through feeder portion 72 along clip feeding direction CF and terminate with output openings 83A, 83B, 83C, 83D respectively. Moreover, downstream end portion 130 of first distance element 117 extends from the connection end 81A of redirection portion 70 and, when coupled to feeder portion 72, protrudes into second channel portion 75B of feeder portion 72, thereby forming at least a portion of first guide channel 80 and second guide channel 82 in feeder portion 72.

As depicted in FIGS. 3A and 3B, feeder portion 72 comprises a housing 76, in the depicted embodiment formed from a sheet metal construction, a second distance element 118 and hold down means 90. Similar to redirection portion 70, sidewalls 140, 142 and top wall 141 of housing 76 form and enclose second channel portion 75B. Second distance element 118 is arranged in second channel portion 75B and partitions second channel portion 75B in first guide channel 80 and second guide channel 82. In the depicted embodiment, an upstream end portion 131 of second distance element 118 comprises a recess 144 that is shaped to receive a corresponding protrusion 143 of downstream end portion 130 of first distance element 117 of redirection portion 70, for coupling redirection portion 70 and feeder portion 72. Feeder portion 72 further comprises first spacer element 84 and second spacer element 86, arranged in first guide channel 80 and second guide channel 82, respectively. In the depicted embodiment first and second spacer elements 84, 86 are arranged at an output end 78 of feeder portion 72. Similar to first and second spacer elements 85, 87 of redirection portion 70, first and second spacer elements 84, 86 of feeder portion 72 partition first guide channel 80 and second guide channel 82 of second channel portion 75B into first guide lane 110, second guide lane 112, third guide lane 114, fourth guide lane 116.

Downstream end portion 138 of second distance element 118 comprises a fork-like shape with a first protrusion 119 and a second protrusion 121. Second distance element 118 comprises a centering pin 150 located at an upper surface and extending generally perpendicular therefrom, as well as a threaded bores 152, 156, with bore 152 provided downstream in clip feeding direction CF from pin 150 and bore 156 provided upstream of pin 150, wherein bores 152, 156 extend generally perpendicular into the second distance element 118 from its upper surface. Housing 76 of feeder portion 72 comprises a plurality of mounting holes 151, 153, 154, 155 in top wall 141, which are aligned along clip feeding direction CF and centered on top wall 141 with respect to sidewalls 140, 142, i.e. mounting holes 151, 153, 154, 155 are each substantially equidistant to sidewalls 140, 142. As depicted in FIGS. 2, 3A, 3B, centering pin 150 is configured to match and be received by mounting hole 154, threaded bores 156 and 152 are each configured to be coupled to housing 76 by screws 153, 159. Similarly, first distance element 117 of redirection portion 70 comprises threaded bores 160, 161 and 162, and housing 74 of redirection portion 70 comprises mounting holes 163, 164. As depicted in FIG. 6, first distance element 117 is configured to be coupled to mounting holes 163, 164 of housing 74 via bores 160, 161 by screws 165, 166, wherein threaded bore 162 of first distance element 117 is configured to be coupled to mounting hole 155 of housing 76 of feeder portion 72 via bore 162 by screw 167.

FIG. 4A is a perspective view of feeder portion 72 wherein second distance element 118 is not depicted. FIG. 4B is a frontal view of feeder portion 72 as seen from output end 78 with first distance element 118 connected to housing 76 by screw 153. FIG. 4B shows how first output opening 83A of first guide lane 110 is formed between sidewall 140 of housing 76 and first spacer element 84, how second output opening 83B of second guide lane 112 is formed between first spacer element 84 and first protrusion 119 of second distance element 118, how third output opening 83C of third guide lane 114 is formed between second protrusion 121 of second distance element 118 and second spacer element 86, and how fourth output opening 83D of fourth guide lane 116 is formed between second spacer element 86 and sidewall 142 of housing 76.

FIG. 4B further exemplifies how a thickness of first spacer element 84 determines a minimum predefined spacing PS1 between first clip C1 and second clip C2 supplied to first placement tool 36 depicted in FIG. 7. FIG. 4B also exemplifies how a distance between a side surface of first protrusion 119 forming a sidewall of second guide lane 112, and a side surface of second protrusion 121 forming a sidewall of third guide lane 114, determines a minimum predefined distance D between second clip C2 of second clip line CL2 supplied to first closing device 32 and third clip C3 of third clip line CL3 supplied to second closing device 34.

It is now referred back to FIG. 7, which is a perspective view of a detail of placement arm 120, in particular placement tools 36, 40 thereof. Placement tools 36 and 40 are formed from a monolithic piece of metal, such as by milling, i.e. they form a single unitary component, also referred to as die 170. Similarly, closing tools 38, 42 are formed from a monolithic piece metal, such as by milling, i.e. they form a single unit, also referred to as punch 172 (cf. FIG. 1A). A particularly advantageous alternative embodiment of a punch or closing assembly 200 is described below with reference to FIGS. 10A and 10B. Turning back to FIG. 7, die 170 may be retained from the conventional clipping machine, before modifying the clipping machine for application of at least four closure clips, as each of seats 44, 46 is wide enough to receive at least two closure clips C. Similarly, punch 172 may be retained in case each of engagement surfaces 54, 56 is wide enough for engaging respective free end portions of at least two closure means. In alternative embodiments, placement tools 36, 40 and closing tools 38, 40 are specially adapted to place and close at least two closure means C. As depicted in FIG. 7, a quick release mechanism 173 is configured to allow coupling of different types of placement tools. A corresponding quick release mechanism is provided at placement arm 122.

Die 170 also comprises first and second severing surfaces 175, 176 for engaging with a corresponding severing protrusion provided in punch 172, which severs closure clips C1, C2, C3, C4 received in seats 44, 46 from respective clip lines CL1, CL2, CL3, CL4, when placement arm 120 and closing arm 122 are moved towards each other to place and close closure clips C1, C2, C3, C4 at plait-like portion P. Moreover, punch 170 comprises a cutting recess 177 configured to receive a blade of cutting means, which are configured to cut plait-like portion P and separate sausage-shaped product S1 just produced from sausage-shaped product S2 to be produced next. A width W of cutting recess 177 is equal to or smaller than predefined distance D between second clip C2 and third clip C3. Predefined distance D provides enough clearance, so that the cutting blade of cutting means of a conventional clipping machine can still be used when the conventional clipping machine has been modified with guide unit GU for application of at least four closure clips.

Referring back to FIGS. 3A and 3B, guide unit GU comprises a first connection hub 126 and second connection hub 124 for being pivotally coupled to placement arm 122. Connection hub 126 is provided in housing 74 of redirection portion 70 in the form of two coaxial mounting holes, one in each of sidewall 133 and sidewall 134. Pivoting axis 181 is formed by extends through the two coaxial mounting holes forming first connection hub 126. In FIG. 2 connection hub 126 is configured to receive shaft 180 which coincides with pivoting axis 181 and connects to placement arm 120, so that guide unit GU is rotatable around shaft 180 with respect to placement arm 120. In other words, connection hub 126 provides guide unit GU with an axis of rotation, in the depicted embodiment pivoting axis 181, which is generally perpendicular to clip feeding direction CF. Connection hub 124 is provided near downstream end 130 of first distance element 117 in the shape of a semicircular recess in the top surface of distance element 117. Connection hub 124 is configured to receive and connect to connecting element or mounting bracket 180 of dampening element 182 which connects connecting hub 124 with placement arm 120. Dampening element 182 is configured to control the travel of guide unit GU while rotating around shaft 180, to bias guide unit GU in the direction of placement arm 120 and to dampen vibrations of guide unit GU resulting from movement of placement arm 120. Housing 74 of redirection portion 70 further comprises covering extensions 79, extending from each of sidewalls 133, 134 against the clip feeding direction CF and forming a covering, that prevents formation of a gap between funnel-like end 100 of clip guide CG and receiving end 77 of guide unit GU upon rotation of guide unit GU with respect to clip guide CG. Such rotation can be caused by rotation of placement arm 120 around axis 123 as well as by pivoting of guide unit GU with respect to placement arm 120.

Referring to FIGS. 3A and 3B, hold down means 90 comprise first portion 94 and second portion 92, with first portion 94 being arranged to cover a downstream portion of guide channel 80 of feeder portion 70 extending to output end 78, and second portion 92 being configured to cover a downstream portion of second guide channel 82 of feeder portion 70 extending to output end 78. As depicted, for example, in FIG. 3A first hold down portion 94 comprises first hold down element 91 and second hold down element 93, and second hold down portion 92 comprises third hold down element 95 and fourth hold down element 96. Each of hold down elements 91, 93, 95, 96 is configured as a plate spring and extends from a top portion of the respective output opening 83A, 83B, 83C, 83D.

FIGS. 8A through 8C demonstrate how closure clips C1, C2, C3, C4 are inserted into seats 44, 46 of first and second placement tools 36, 40. Insertion means are coupled to placement arm 120, in the depicted embodiment formed by insertion arm 60, which are configured to insert respective closure means into first and second placement tools 36, 40. Insertion arm 60 (depicted in FIG. 9) is pivotally connected to eccentric shaft 65 (depicted in FIG. 6) and comprises a guiding recess 63 configured to engage guiding pin 67 of placement arm 120. Insertion arm 60 further comprises first intermeshing element 61 and second intermeshing element 62. Eccentric shaft 65 is moved on a circular path around a rotational axis of a drive unit 69 connected to placement arm 120 (depicted in FIG. 7). The interaction of circular motion of shaft 65 and linear guidance along recess 63 by guiding pin 67 results in a combination of up-and-down and tilting motion of intermeshing elements 61, 62 as further described below.

FIG. 8A shows a first position of insertion arm 60 with intermeshing elements 61 and 62 located in an opening 71 formed between adjacent leg portions 50 of adjacent clips C beneath flared portions 52. In the first position of insertion arm 60, intermeshing elements 61, 62 do not yet engage with their portions. Intermeshing element 61 is configured to be disposed in an opening 71 formed between two adjacent closure clips C of first clip line CL1, and simultaneously in a corresponding opening 71 formed between two adjacent clips C of second clip line CL2. Likewise, intermeshing element 62 is configured to be disposed in an opening 71 formed between two adjacent closure clips C of third clip line CL3, and simultaneously in a corresponding opening 71 formed between two adjacent closure clips C of fourth clip line CL4.

FIG. 8B shows a second position of insertion arm 60, wherein intermeshing elements 61, 62 have moved up and towards guide unit GU and engaged with flared portions 52 of openings 71 of clip lines CL1, CL2, CL3, CL4. As seen in FIG. 8B insertion arm 60 has lifted clip lines CL1, CL2, CL3, CL4 up towards guide unit GU by lifting height H, closed initial gap 190 between clip lines and hold down means 90, and brought the clip lines into contact with hold down means 90. Insertion arm 60 biases the clip lines against hold down means 90 and thereby pivots guide unit GU around shaft 180. As can also be seen in FIG. 8B, insertion arm 60 has tilted around guiding pin 67 and thereby advanced clip lines CL1, CL2, CL3, CL4 by length L.

When further advancing clip lines CL1, CL2, CL3, CL4, flared portions 52 of clips C forming downstream ends 89 of the clip lines, which are to be placed in the respective placement tools 36, 40, come into contact with curved hold down elements 91, 93, 95, 96. Hold down elements 91, 93, 95, 96 bias the respective clips downwards, so that the clips are guided towards the respective seat when transfer arm 60 is moved downwards again to its third position depicted in FIG. 8C. In the third position, depicted in FIG. 8C, transfer arm 60 is no longer in contact with the clip lines and initial gap 190 is again present between the clip lines and hold down means 90.

Transfer arm 60 then further moves downwards, out of opening 71, tilts back against the clip feeding direction CF and upon moving back up again, enters opening 73 formed between a pair of closure clips C upstream clip feeding direction CF from opening 71. Insertion arm 60 has then returned to its first position depicted in FIG. 8A and the transport cycle repeats.

As best depicted in FIGS. 8A through 8C, first spacer element 84, and likewise second spacer element 85, arranged toward output end 78 of feeder portion 72, do not extend over the entire length of feeder portion 72. Thereby, clearance 182 is provided for the movement of intermeshing elements 61, 62 of insertion arm 60.

An alternative embodiment of a punch or closing assembly 200 is depicted in FIGS. 10A and 10B, as has already been mentioned above. Closing assembly 200 is configured to be reversibly moved toward plait-like portion P for closing first, second, third, and fourth closure clip C1, C2, C3, C4 placed thereon by placement tools 38, 40, in a manner generally corresponding to punch 172 described above. Compared to punch 172 however, and as will be further detailed below, closing assembly 200 is configured to sequentially close one or more selected closure clips of the total of four closure clips C1, C2, C3, C4 in respective subsequent closing steps. In the depicted embodiment, closing assembly 200 is particularly configured to close inner pair of closure clips C2, C3 placed on inner portion P2* (cf. FIG. 1B) of plait-like portion P in a first closing step. Moreover, in the depicted embodiment, closing assembly 200 is particularly configured to close at least one of closure clips C1, C4 of the outer pair of closure clips placed on outer portion P1* (cf. FIG. 1B) in a subsequent second closing step. If necessary, the other one of closure clips C1, C4 of the outer pair of closure clips placed on outer portion P1* (cf. FIG. 1B) is closed in a subsequent third closing step.

Closing assembly 200 comprises a first closing tool 202 (also referred to as fixed closing tool) and a second closing tool 204 (also referred to as moveable closing tool) and is removably attachable to closing arm 120 (not depicted) via cylindrical connection portion 206 extending from a lower portion of closing assembly 200. Cylindrical connection portion 206 is configured to engage a corresponding receiving portion of closing arm 120. Cylindrical connection portion 206 thus serves as a coupling means. Moreover, closing assembly 200 comprises a profiled upper portion 208, configured to engage a corresponding quick release mechanism on closing arm 120 for fixing and releasing closing assembly 200 to and from closing arm 120.

At the lower portion of closing assembly 200, first closing tool 202 provides a fixed engagement surface 210 that functionally corresponds to engagement surface 54 of punch 172 described above, i.e. is configured to engage respective free end portions of at least two closure means such as closure clips C, i.e. clips C2, C3. Likewise, fixed engagement surface 210 is adapted to the shape of closure clips C so as to provide a receiving zone wherein the free end portions of closure clips C are received during their closure. Fixed engagement surface 210 is shaped to guide the free ends of closure clips C received therein, so that the free ends follow the curvature of fixed engagement surface 210 when closing assembly 200 is moved toward die 170 discussed above with reference to FIGS. 6 to 8C.

In the depicted embodiment, second closing tool 204 comprises a pair of pivoting closing prongs 212, with a respective pivotal closing prong 212 attached to opposing sides of closing assembly 200 by means of a common pivot axis 214 extending at least substantially parallel to longitudinal axis A. In FIGS. 10A, 10B only one of prongs 212 is fully visible, as the other prong 212 is located on the side of closing assembly 200 that is opposite to the direction of view and thus mostly obstructed by closing assembly 200. Each of closing prongs 212 comprises a linkage portion 216, configured to be linked to a control rod (not depicted) and to provide leverage with respect to common pivot axis 214. Linkage portion 216, through aforementioned leverage, is configured to pivot prong 212 from a disengaged position shown in FIG. 10A to an engaged position shown in FIG. 10B, by transferring a respective movement of the control rod. Moreover, each closing prong 212 comprises an engagement portion 218 extending from a side substantially opposite of linkage portion 216. Engagement portion 218 comprises engagement surface 220 that is functionally substantially identical to fixed engagement surface 210 of first engagement portion 202, the only difference being that engagement surface 220 is configured to engage at least one closure clip C, i.e. clip C1 or clip C4 instead of at least two closure clips C.

Similar to punch 172 discussed above, in order to engage free ends of closure clips C1, C2, C3, C4 and therefore apply clips C1, C2, C3, C4 to sections of plait-like portion P of the tubular or bag-shaped packaging casing, assembly 200 is reversibly moved towards plait-like portion P along a generally vertical direction. As can be inferred from FIGS. 10A, 10B, pivoting axis 214 extends in a direction that is substantially perpendicular to the direction of travel of closing assembly 200 during said movement. Thus, the disengaged position of closing prongs 212 shown in FIG. 10A is a position in which the respective engagement portions 218, and engagement surfaces 220 in particular, will not come into engagement with the free ends of closure clips C1, C4 of the outer pair of closure clips C of outer section P1* during said movement. However, since fixed engagement surface 210 is always facing in the direction of travel, when closing assembly 200 is moved towards plait-like portion P with prongs 212 in the disengaged position, first closing tool 202 engages and closes closure clips C2, C3 of inner section P2*. Put in other words, second closing tool 204 is out of alignment with first closing tool 202, when second closing tool 204 is in the disengaged position.

In the engaged position of prongs 212, shown in FIG. 10B, a respective stop 222 extending from each side of closing assembly 200 maintains engagement portions 218 in a position such that engagement surfaces 220 are substantially aligned with fixed engagement surface 210. Therefore, when closing assembly 200 is moved toward plait-like portion P, engagement surfaces 220 likewise face in the direction of travel. Consequently, when in the engaged position, prongs 212 will engage and close closure clips C1, C4 of outer section P1*.

Closing assembly 200 is particularly advantageous for refitting conventional clipping machines. A preferred method of sequential operation of such a refitted clipping machine comprises moving placement arm and therefore placement tools 36, 40 into the placement position such that four closure clips C1, C2, C3, C4 are placed on plait-like portion P, similar to the method described above. However, closing clips C1, C2, C3, C4 is then performed in at least two sequential steps, as opposed to the simultaneous closing operation described above. In a first closing step, closing assembly 200 is moved toward plait-like portion P with prongs 212 in the disengaged position, such that inner closure clips C2, C3 of inner section P2* are closed. Closing assembly 200 is then moved away from plait-like portion P, while placement arm 120 and thus placement tools 36, 40 are maintained in the placement position. Therefore, while outer closure clips C1, C4 are not yet closed around outer section P1* at this stage, they remain placed thereon by placement tools 36, 40. For the second closing step, closing prongs 212 are then brought into the engaged position, and closing assembly 200 is again moved toward plait-like portion P, such that outer closure clips C1, C4 of outer section P1* are closed.

This afore-described preferred method of sequential operation may provide the particular benefit that in each of the first and second closing step, a closing force required for closing the respective pairs of closure clips substantially corresponds to a closing force required during conventional operation, i.e. when only a single pair of closure clips C is applied to plait-like portion P. Therefore, it may beneficially possible to retain the existing driving means when refitting the conventional clipping machine for application of four closure clips C.

It has to be understood however, that closing assembly 200 is not limited to the depicted embodiment, nor to the afore-described particular method of sequential operation. It may for example be desired that first closing tool 202 is configured for closing only a single, first closure clip. Thereby, the first closure clip may be closed in a first closing step and second and third closing clips may be closed simultaneously in a subsequent second closing step, or sequentially in respective subsequent second and third closing steps.

Alternatively or additionally, further pivotal closing prongs 212 may be provided, each configured to close a respective one or more closing clips C. Alternatively, only a single pivoting closing prong 212 is provided. More preferably, a single closing prong 212 is configured for engaging and closing two closure clips C. Thus, a clipping machine comprising closing assembly 200 may be operated such that a pair of downstream closing clips C1, C2 on downstream portion P1 (cf. FIG. 1B) of plait-like portion P is closed in a first closing step, and upstream pair of closing clips C3, C4 placed on upstream section P2 is closed in a subsequent second closing step.

In further or different embodiments, each of one or more closing prongs 212 is selectively movable between the engaged and disengaged position, independently of the other closing prongs 212. Thereby, the method of operation of the clipping machine can advantageously be adapted to the number of closing clips C to be applied to plait-like portion P, and/or to a desired number of closing steps for closing a particular number of closing clips C placed on plait-like portion P.

As is obvious from the detailed summary of the present invention, which provides ample design alternatives, which are particularly suited to replace or modify individual features of the depicted preferred embodiment, as well as various combinations thereof, a clipping machine, a guide unit, a closing assembly and a method according to the present invention are not limited to the specific embodiment depicted in the drawings and/or described in conjunction therewith.

The invention claimed is:

1. A closing assembly for use with a clipping machine for producing sausage-shaped products the closing assembly comprising:
   coupling means such as a connection portion for removably attaching the closing assembly to a clipping machine;
   at least one fixed closing tool comprising an engagement surface configured for engaging at least a portion of at least one closure means; and
   at least one moveable closing tool being moveable between an engaged position and a disengaged position, the at least one moveable closing tool comprising an engagement surface configured for engaging at least a portion of at least one closure means;
   wherein:
   in the engaged position, the at least one moveable closing tool is in alignment with the at least one fixed closing tool, such that the engagement surface of the at least one moveable closing tool and the engagement surface of the at least one fixed closing tool face substantially in the same direction; and
   in the disengaged position, the at least one moveable closing tool is out of alignment with the at least one fixed closing tool, such that the engagement surface of the at least one moveable closing tool and the engagement surface of the at least one fixed closing tool face in different directions.

2. The closing assembly of claim 1, wherein the at least one fixed closing tool and/or the at least one moveable closing tool is configured to close at least one respective closure means such as a closure clip placed on a plait-like portion of a sausage-shaped product to be produced.

3. The closing assembly of claim 1, comprising two moveable closing tools which are independently moveable between their respective engaged and disengaged positions.

4. The closing assembly of claim 3, wherein each of the two moveable closing tools is configured to close one respective closure means such as a closure clip placed on a plait-like portion of a sausage-shaped product to be produced.

5. The closing assembly of claim 4, wherein the at least one fixed closing tool is configured to close two closure means.

6. A clipping machine for producing sausage-shaped products containing a filling material in a tubular or bag-shaped packaging casing, the clipping machine comprising:
   gathering means for forming a plait-like portion of the tubular or bag-shaped packaging casing; and
   a closing unit for applying at least four closure means to the plait-like portion of the tubular or bag-shaped packaging casing, the closing unit comprising a closing assembly as defined in claim 1.

7. A method for producing sausage-shaped products containing a filling material in a tubular or bag-shaped packaging casing, the method comprising the steps of:
   filling at least a portion of a tubular or bag-shaped packaging casing with filling material;
   forming a plait-like portion substantially free of filling material from the tubular or bag-shaped packaging casing filled with filling material; and
   applying at least four closure means to the plait-like portion of the tubular or bag-shaped packaging casing, by placing the at least four closure means on the plait-like portion substantially simultaneously in a single placement step and by closing the at least four closure means placed on the plait-like portion in at least one closing step.

8. The method of claim 7, wherein the at least one closing step comprises:
   bending respective free end portions of at least one closure means around at least a portion of a periphery of the plait-like portion so that, when the at least one closure means is applied to the plait-like portion, the free end portions of the at least one closure means are substantially aligned with respect to each other.

9. The method of claim 7, comprising closing at least a first closure means of the at least four closure means placed on the plait-like portion in a first closing step and closing at least a second closure means of the at least four closure means placed on the plait-like portion in a subsequent second closing step.

10. The method of claim 7, wherein a first pair of closure means of the at least four closure means is closed in a first closing step and a second pair of closure means of the at least four closure means is closed in a subsequent second closing step.

11. The method of claim 10, wherein the first pair of closure means is one of an outer pair of closure means applied to an outer section of the plait-like portion and an inner pair of closure means applied to an inner section of the plait-like portion.

12. The method of claim 10, wherein the first pair of closure means is closed by a first closing tool and the second pair of closure means is closed by a second closing tool.

* * * * *